United States Patent

Huntzinger et al.

(10) Patent No.: US 12,174,056 B2
(45) Date of Patent: *Dec. 24, 2024

(54) WEIGHT MEASUREMENT DEVICE AND METHOD OF USING THE SAME

(71) Applicant: Honeywell International Inc., Charlotte, NC (US)

(72) Inventors: Bradley J. Huntzinger, Columbus, OH (US); James D. Cook, Columbus, OH (US); Bhim P. Khanal, Blacklick, OH (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,519

(22) Filed: Dec. 6, 2023

(65) Prior Publication Data

US 2024/0110822 A1 Apr. 4, 2024

Related U.S. Application Data

(63) Continuation of application No. 16/805,450, filed on Feb. 28, 2020, now Pat. No. 11,892,340.

(51) Int. Cl.
*G01G 21/14* (2006.01)
*G01G 3/13* (2006.01)
(Continued)

(52) U.S. Cl.
CPC ............... *G01G 21/14* (2013.01); *G01G 3/13* (2013.01); *G01G 21/24* (2013.01); *G01G 19/42* (2013.01)

(58) Field of Classification Search
CPC ...... G01G 19/44; G01G 21/085; G01G 21/23; G01G 21/14; G01G 3/13
(Continued)

(56) References Cited

U.S. PATENT DOCUMENTS 628,525 A 7/1899 Chandler
997,203 A 7/1911 Michel
(Continued)

FOREIGN PATENT DOCUMENTS

CH 661354 A5 7/1987
CN 2748882 Y 12/2005
(Continued)

OTHER PUBLICATIONS

Advisory Action (PTOL-303) Mailed on Aug. 8, 2023 for U.S. Appl. No. 16/805,450, 3 page(s).
(Continued)

*Primary Examiner* — Peter J Macchiarolo
*Assistant Examiner* — Monica S Young
(74) *Attorney, Agent, or Firm* — Alston & Bird LLP

(57) ABSTRACT

Various embodiments are directed to methods and apparatuses for determining a weight of one or more objects disposed about an area of the weight measurement device using a single force sensor to accurately measure a force generated by the one or more objects. In various embodiments, the apparatus comprises a housing, a receiving tray, a lever assembly configured to receive a weight force from the receiving tray and generate a collective lever force corresponding to the weight force, the lever assembly comprising a plurality of levers, wherein each lever of the plurality of levers being at least substantially fixed to the housing at a first lever location and configured to receive a partial weight force from the receiving tray at a second lever location, and a force sensor configured to define a fulcrum point along each of the plurality of levers.

20 Claims, 9 Drawing Sheets

(51) Int. Cl.
*G01G 19/42* (2006.01)
*G01G 21/24* (2006.01)

(58) Field of Classification Search
USPC .......................................................... 177/256
See application file for complete search history.

(56) References Cited

U.S. PATENT DOCUMENTS

| | | | |
|---|---|---|---|
| 1,094,581 | A | 4/1914 | McCumber |
| 2,241,348 | A | 5/1941 | Hem |
| 3,831,687 | A | 8/1974 | Maffia et al. |
| 4,139,070 | A | 2/1979 | Hanson et al. |
| 4,276,949 | A | 7/1981 | Knothe et al. |
| 4,458,770 | A | 7/1984 | Bucci |
| 4,493,220 | A | 1/1985 | Carignan et al. |
| 4,738,324 | A | 4/1988 | Borchard |
| 4,819,750 | A | 4/1989 | Carnevale |
| 4,844,189 | A | 7/1989 | Shisgal et al. |
| 5,373,116 | A | 12/1994 | Schneider |
| 5,708,236 | A | 1/1998 | Shaanan et al. |
| 2003/0066690 | A1 | 4/2003 | Germanton |
| 2006/0207805 | A1 | 9/2006 | Williamson |
| 2010/0307839 | A1 | 12/2010 | Bradley |

FOREIGN PATENT DOCUMENTS

| | | |
|---|---|---|
| JP | 3924961 B2 * | 6/2007 |
| WO | 03/14676 A2 | 2/2003 |

OTHER PUBLICATIONS

Advisory Action (PTOL-303) Mailed on Dec. 1, 2022 for U.S. Appl. No. 16/805,450.

CN Decision on Rejection Mailed on May 24, 2023 for CN Application No. 202110217639, 9 page(s).

CN Office Action Mailed on Nov. 3, 2022 for CN Application No. 202110217639, 9 page(s).

English Translation of CN Office Action dated Nov. 3, 2022 for CN Application No. 202110217639, 10 page(s).

English Translation of Decision on Rejection dated May 24, 2023 for CN Application No. 202110217639, 6 page(s).

English translation of JP Decision to Grant dated Feb. 28, 2022 for JP Application No. 2021029394, 2 page(s).

Examiner Interview Summary Record (PTOL-413) Mailed on Aug. 8, 2023 for U.S. Appl. No. 16/805,450, 2 page(s).

Examiner Interview Summary Record (PTOL-413) Mailed on Sep. 7, 2023 for U.S. Appl. No. 16/805,450, 1 page(s).

Final Office Action Mailed on Sep. 6, 2022 for U.S. Appl. No. 16/805,450.

Final Rejection Mailed on May 15, 2023 for U.S. Appl. No. 16/805,450, 30 page(s).

JP Decision to Grant Mailed on Feb. 28, 2022 for JP Application No. 2021029394, 3 page(s).

JP Office Action Mailed on Nov. 22, 2021for JP Application No. 2021-029394, 4 page(s).

Kebede et al., Decoupled Six-Axis Force-Moment Sensor with a Novel Strain Gauge Arrangement and Error Reduction Techniques, 2019, [online article] [retrieved on Mar. 26, 2020] retrieved from the Internet URL: https://www.ncbi.nlm.nih.gov/pubmed/31288472, 14 pages.

Khong et al., Design and Implementation of a Three-axis Force Sensor for Application to Bilateral Teleoperation Systems, 2015, [online article] [retrieved on Mar. 26, 2020] retrieved from the Internet URL: https://ieeexplore.ieee.org/document/7222801, 6 pages.

Liu et al., A Micro-Force Sensor with Beam-Membrane Structure for Measurement of Friction Torque in Rotating MEME Machines, 2017, [online article] [retrieved on Mar. 26, 2020] retrieved from the Internet URL: https://www.semanticscholar.org/paper/A-Micro-Force-Sensor-with-Beam-Membrane-Structure-Liu-Yu/678f2994ebad30c70ff56cbde77aab11e4526f8d, 12 pages.

Non-Final Office Action Mailed on May 17, 2022 for U.S. Appl. No. 16/805,450.

Non-Final Rejection Mailed on Dec. 20, 2022 for U.S. Appl. No. 16/805,450.

Notice of Allowance and Fees Due (PTOL-85) Mailed on Oct. 2, 2023 for U.S. Appl. No. 16/805,450, 3 page(s).

Notice of Allowance and Fees Due (PTOL-85) Mailed on Sep. 7, 2023 for U.S. Appl. No. 16/805,450, 11 page(s).

* cited by examiner

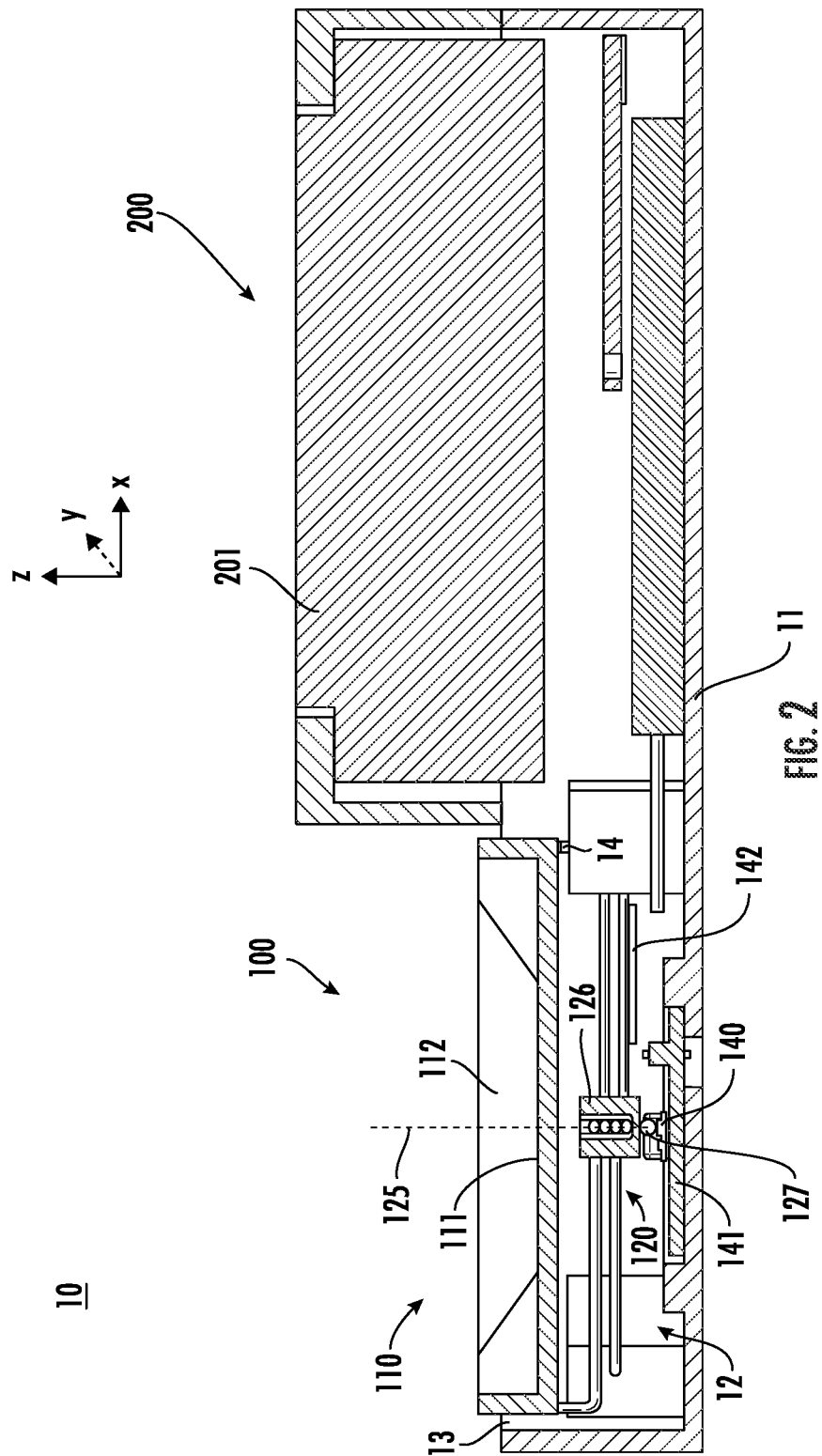

WEIGHT MEASUREMENT DEVICE AND METHOD OF USING THE SAME

CROSS-REFERENCE TO RELATED APPLICATIONS

This patent application is a continuation of U.S. patent application Ser. No. 16/805,450, filed Feb. 28, 2020, which is incorporated herein by reference in its entirety.

FIELD OF THE INVENTION

Various embodiments described herein relate generally to weight measurement devices. In particular, various embodiments are directed to weight scales configured to determine the weight of one or more objects based on a force applied to the weight scale by the one or more objects.

BACKGROUND

Industrial and commercial applications may use weight measurement devices to determine the weight an object. In particular, weight measurement devices may be used to measure the weight of one or more objects engaged therewith by measuring the force generated by the one or more objects and transmitted to the weight measurement device. Through applied effort, ingenuity, and innovation, Applicant has solved problems relating to weight measurement devices by developing solutions embodied in the present disclosure, which are described in detail below.

BRIEF SUMMARY

Various embodiments are directed to a weight measurement device comprising: a housing; a receiving tray; a lever assembly configured to receive a weight force from the receiving tray and generate a collective lever force corresponding to the weight force, the lever assembly comprising a plurality of levers, wherein each lever of the plurality of levers is at least substantially fixed to the housing at a first lever location and configured to receive a partial weight force from the receiving tray at a second lever location; and a force sensor configured to generate force sensor data based at least in part on the collective lever force; wherein the force sensor is configured to define a fulcrum point along each of the plurality of levers. In various embodiments, the collective lever force may comprise a point force; and the force sensor data may correspond at least in part to the object weight of the at least one object. In various embodiments, the collective lever force may be based at least in part on a sum of partial lever forces transmitted from each of the plurality of levers; wherein each partial lever force is defined at least in part by a lever ratio and the partial weight force received by a respective lever of the plurality of levers.

In various embodiments, the apparatus may further comprise a controller configured to generate weight measurement data based at least in part on the force sensor data, wherein the weight measurement data corresponds at least in part to the object weight of the at least one object. In various embodiments, the controller may be further configured to generate inventory measurement data based at least in part on the weight measurement data, wherein the inventory measurement data comprises an object count. In various embodiments, the plurality of levers may comprise at least three levers. In various embodiments, each of the plurality of levers may extend along a respective horizontal plane across at least a portion of an internal housing portion defined by the housing, and wherein a portion of each of the plurality of levers extends through a vertical lever alignment axis such that the plurality of levers is arranged in a vertical stack configuration. In certain embodiments, the plurality of levers may be evenly distributed about the vertical lever alignment axis such that each angular distance between adjacent levers of the plurality of levers is at least substantially the same.

In various embodiments, the force sensor may be at least substantially aligned with the vertical lever alignment axis such that the fulcrum point of each of the plurality of levers is at least substantially aligned with the vertical lever alignment axis, and wherein the force sensor is constrained against movement in the vertical direction. In certain embodiments, the lever assembly may further comprise a lever alignment component configured to at least partially constrain against movement of each of the plurality of levers so as to prevent the lever alignment axis from shifting in either a lateral direction or an angular direction. In various embodiments, the apparatus may further comprise at least one receiving tray stop configured to at least partially restrict a range of motion of the receiving tray. In various embodiments, each of the plurality of levers may comprise a lever ratio defined at least in part by a ratio of a total lever length to a lever fulcrum length. In certain embodiments, the collective lever force may comprise a product of the lever ratio and a weight force magnitude of the weight force. Further, in various embodiments, the lever fulcrum length may comprise a distance between the first lever end and the fulcrum point, and the lever ratio of each of the plurality of levers is at least substantially equal.

In various embodiments, the collective lever force may be defined at least in part by a collective lever force magnitude, and wherein the lever assembly is further configured such that the collective lever force magnitude is a multiple of a weight force magnitude of the weight force. In various embodiments, the collective lever force may be defined at least in part by a collective lever force magnitude, and wherein the lever assembly is further configured such that the collective lever force magnitude is a fraction of a weight force magnitude of the weight force. In various embodiments, each of the plurality of levers may comprise a lever tray interfaces disposed about the second lever end and configured to engage the receiving tray so as to define at least a portion of a measurement area perimeter configured to define an outer boundary of a measurement area of the receiving tray, wherein the weight measurement device is configured such that, upon a force being applied to the measurement area in a substantially vertical direction, a net moment realized by the receiving tray is at least substantially zero. In various embodiments, the apparatus may further comprise a user interface portion, the user interface portion comprising a user interface display configured to display one or more of force sensor data, weight measurement data, and inventory measurement data. In various embodiments, the receiving tray may be configured to receive the at least one object, the at least one object being defined at least in part by the object weight, wherein the receiving tray is further configured to receive the weight force corresponding to the object weight from the at least one object.

Various embodiments are directed to a method of generating weight measurement data corresponding to one or more objects, the method comprising: receiving a weight force corresponding to an object weight generated by one or more objects at a receiving tray; transmitting the weight force to a lever assembly operatively connected to the receiving tray, the lever assembly comprising a plurality of levers, wherein each of the plurality of levers comprises a first lever end comprising an at least substantially fixed configuration and second lever end engaged with the receiving tray; generating a collective lever force based at least in part on a configuration of the plurality of levers of the lever assembly, the collective lever force corresponding at least in part to the weight force; transmitting the collective lever force to a force sensor operatively connected to the lever assembly; generating force sensor data based at least in part on the collective lever force received by the force sensor; and generating weight measurement data based at least in part on the force sensor data, wherein the weight measurement data comprises the object weight of the at least one object.

In various embodiments, the plurality of levers may be configured such that each of the plurality of levers extends along a respective horizontal plane and through a vertical lever alignment axis such that the plurality of levers is arranged in a vertical stack configuration. In various embodiments, wherein generating weight measurement data based at least in part on the force sensor data may comprise applying one or more compensation factors to the generated weight measurement data to account for one or more of ambient conditions associated with the ambient environment and a multiplication factor realized by the force sensor data based at least in part on the configuration of the lever assembly. In various embodiments, the method may further comprise generating inventory measurement data based at least in part on the weight measurement data, wherein the inventory measurement data comprises an object count. In certain embodiments, the method may further comprise receiving user input comprising a user selection of a designated object type corresponding to a known object type of the one or more objects associated with the object weight.

BRIEF DESCRIPTION OF THE SEVERAL VIEWS OF THE DRAWINGS

Reference will now be made to the accompanying drawings, which are not necessarily drawn to scale, and wherein:

FIG. 2 illustrates a cross-sectional view of an exemplary apparatus in accordance with various embodiments;

DETAILED DESCRIPTION

Figure 1:
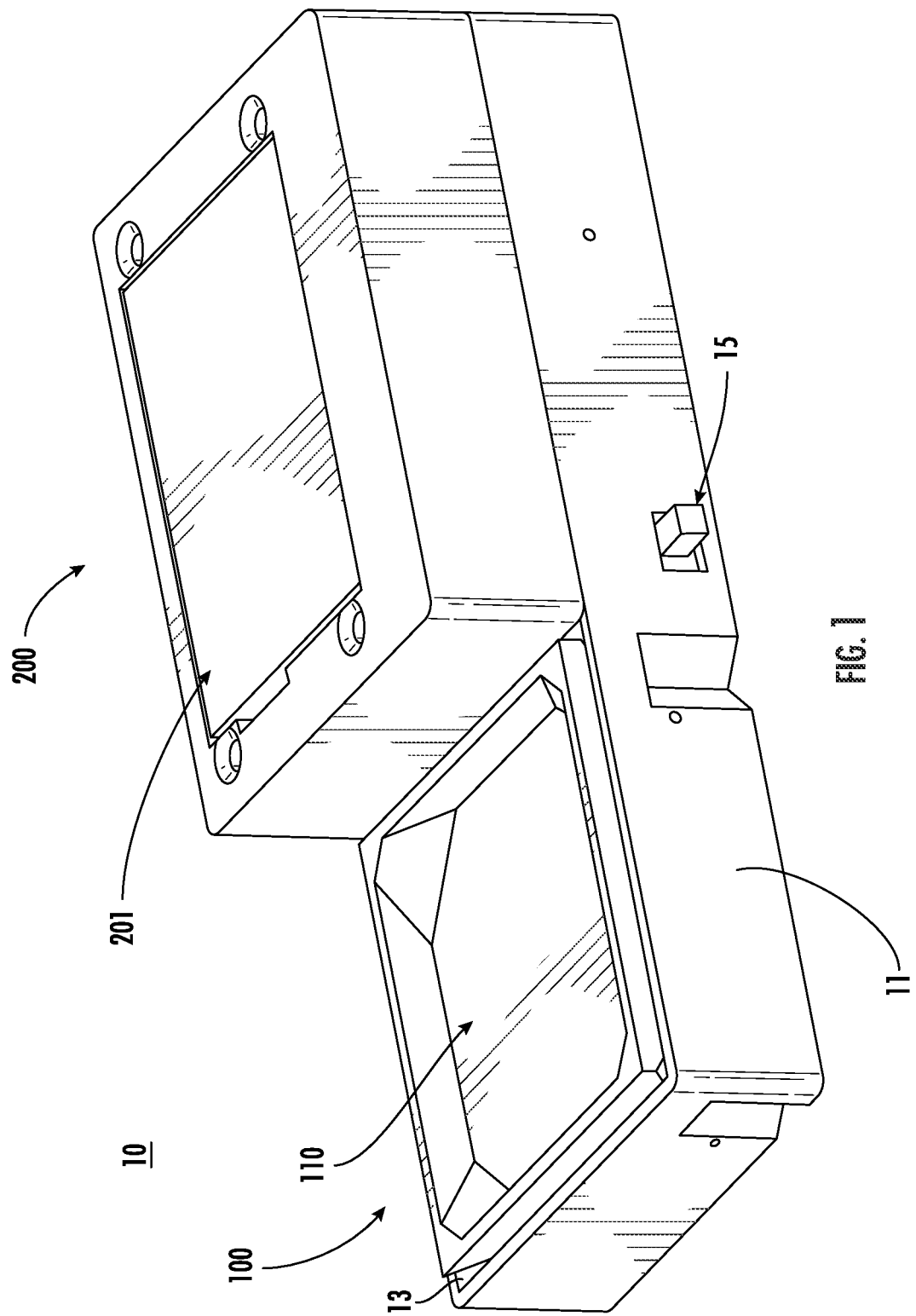
FIG. 1 illustrates a perspective view of an exemplary apparatus in accordance with various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are described below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Described herein is a weight measurement device configured to determine a weight of one or more objects disposed about an area of the weight measurement device using a single force sensor to accurately measure a force generated by the one or more objects. In various applications, weight measurement devices may be used to measure the weight of one or more small objects. For example, in various medical applications, a weight measurement device may be used to weight and/or otherwise keep track of various medications, medical devices, items having a relatively small mass, and/or the like. As a further example, weight measurement devices may be used to weigh one or more paper bills within a cash register. In such a circumstance, due at least in part to the minimal forces generated by the one or more small object, the weight measure device have a high degree of resolution in order to be able to detect and/or distinguish the forces generated by the one or more small objects. In some examples, weight measurement devices may achieve such a high degree of resolution by utilizing a force sensor, such as, for example, a piezo-resistive force sensor to detect the weight force generated by the one or more small objects. Piezo-resistive force sensors may be configured to operate with a high degree of resolution such that the sensor may accurately detect miniscule variances in a force being applied thereto that may be undetectable by larger and/or less precise force sensors. Piezo-resistive force sensors may be configured such that in order for a force to be detected by the sensor, the force must be applied directly to a receiving face of the sensor. Where piezo-resistive force sensors are often relatively small in size, the surface area of a corresponding receiving face thereof may be similarly small, thereby restricting the area capable of detecting a weight force such that the area of the weight measurement device configured to receive the one or more small objects may be confined in a similar manner. As such, said weight measurement devices may be incapable of accurately accommodating an object that is large in size, but small in mass.

Alternatively or additionally, various weight measurement devices may comprise relatively large receiving areas, as compared to the size of the piezo-resistive force sensor. In such examples, weight measurement devices utilizing large object receiving areas coupled directly to a single piezo-resistive force sensor such that may experience inaccuracies and measurement errors resulting in a variance in the sensor output depending on where about the receiving area the weight force of the one or more small objects are being applied. For example, a moment force may be generated which may result in the unwarranted movement of various device components in a lateral and/or angular direction. Such misalignment of the force distribution of the weight force relative to the piezo-resistive force sensor may cause inaccurate sensor outputs and/or unwarranted physical engagement between various device components resulting in both immediate device errors and decreased measurement performance over the lifetime of the weight measurement device.

In some examples, similar weight measurement devices utilizing relatively large object receiving areas comprise a plurality of piezo-resistive force sensors. Such weight measurement devices may be configured such that at least one of the plurality of sensor may be configured to receive the weight force transmitted to the receiving area by the one or more small objects. However, such an exemplary device may comprise a large number of components such that the weight measurement device may require high manufacturing costs and high materials costs, which may be cost prohibitive in many applications.

Described herein is a method and apparatus for reliably measuring the weight of one or more objects using a weight measurement device. In some examples, the weight measurement device described herein may utilize relatively large receiving tray—compared to the size of the piezo-resistive force sensor—and a lever assembly comprising a plurality of levers engaged with the receiving tray and configured to convert the force transmitted to the receiving tray by the one or more small objects into a singular point force that may be transmitted to the piezo-resistive force sensor. The lever assembly may be operatively connected to the receiving tray such that regardless of the location of the weight force about the receiving tray of the weight measuring device, the lever assembly may be configured to transmit a collective lever force corresponding to the weight force to the force sensor in a substantially vertical direction. Further, the plurality of levers of the lever assembly may be configured such that the net moment force realized by the receiving tray is at least substantially zero. The plurality of levers of the lever assembly may be arranged about an internal housing portion of the weight measurement device such that at least a portion of each of the plurality of levers may extend through a substantially central portion of the device internal housing portion. As such, the plurality of levers may be configured in a vertical stack configuration such that at least a portion of each of the plurality of levers is aligned along a vertical lever alignment axis. The weight force received by the receiving tray may be distributed to the plurality of levers of the lever assembly, which may be configured to utilize the vertical stack configuration convert the weight force received at the measurement area of the receiving tray to a singular point force extending in a vertical direction along the lever alignment axis, which may be at least substantially aligned with the piezo-resistive force sensor configured to receive the collective lever force from the lever assembly. By utilizing a plurality of levers operatively connected between a receiving tray and a device housing, an exemplary weight measurement device described herein may eliminate the need for multiple force sensor while simultaneously enabling the measurement of a weight force transmitted to a relatively large, and potentially offset, receiving area relative to the configuration of the force sensor. The exemplary weight measurement device described herein enables a low-cost, precise measurement of a weight force of one or more objects distributed about a receiving area that is large enough to accommodate the measurement of a wide variety of object types without sacrificing device performance.

In various embodiments, the weight measurement device 10 may be configured to receive an object. Specifically, the weight measurement device 10 may be configured to receive at least one object at a scale portion 100 thereof. The weight measurement device 10 may be configured to measure the weight of the at least one object disposed upon the scale portion 100 based at least in part on the force transmitted from the at least one object to the receiving tray 110 of the scale portion 100 upon which the at least one object is disposed. In various embodiments, the weight measurement device 10 may be further configured to utilize a controller to execute one or more calculations and display a value corresponding to, for example, the weight of the at least one object at a user interface portion 200 of the weight measurement device 10.

As illustrated in FIG. 1, the weight measurement device 10 may comprise a housing 11 defining an interior housing portion in which one or more exemplary components of the weight measurement device 10 described herein may be disposed. In various embodiments, the housing 11 may be made at least in part of rigid materials (e.g., rigid plastic materials) and/or resilient materials (e.g., resilient polymeric materials). In various embodiments, the housing 11 may comprise a plurality of sidewalls, which may define an outer portion of both the scale portion 100 and the user interface portion 200 of the weight measurement device 10. In various embodiments, the housing 11 may define a receiving tray bottom surface configured to support the weight measurement device 10 in an upright orientation relative to a substantially horizontal support surface on which the weight measurement device 10 may be disposed. For example, the receiving tray bottom surface of the housing 11 may extend along an at least substantially horizontal plane defining at least a portion of both the length and the width of the weight measurement device 10. Further, the housing 11 of the weight measurement device 10 may comprise a receiving tray opening 13, as described herein, embodied as an opening through which at least a portion of the receiving tray 110 of the scale portion of the device 10 may extended. As described herein, the receiving tray opening 13 may be defined at least in part by the plurality of sidewalls of the housing 11 and may be configured so as to allow the receiving tray 110 to move relative to the housing 11 in a substantially vertical direction into and out of the interior housing portion. In various embodiments, the housing 11 may be configured such that a user interface display 201 may be visible from the perspective of a user external to the housing 11 of the weight measurement device 10. In various embodiments, the weight measurement device 10 may be, at least in part, a weight scale used for precisely measuring the weight of one or more objects. In various embodiments, the housing 11 of the weight measurement device 10 may comprise an isolation portion, which may be configured to at least substantially isolate the scale portion 100 (e.g., the receiving tray 110) of the weight measurement device 10 from interaction with various unwarranted external forces generated by the ambient environment in order to reduce errors in the output generated by the scale portion. For example, the isolation portion of the housing 11 may be configured to prevent unwarranted fluid flow (e.g., wind gusts) from engaging the receiving tray 110 and transmitting a force to the lever assembly that may be detected by the force sensor 140.

In various embodiments, the weight measurement device 10 may comprise a power supply (e.g., batteries) and a controller, such that one or more components of the weight measurement device 10, as described herein, may be electronically and communicatively connected to the power supply. As non-limiting examples, the power supply may comprise one or more batteries, one or more capacitors, one or more constant power supplies (e.g., a wall-outlet), and/or the like. In some embodiments the power supply may comprise an external power supply positioned outside of the weight measurement device 10 and configured to deliver alternating or direct current power to the weight measurement device 10. Further, in some embodiments, the power supply may comprise an internal power supply, for example, one or more batteries, positioned within the weight measurement device 10. For example, the internal power supply may be embodied as a rechargeable power supply, wherein the weight measurement device 10 further comprises a charging port disposed within the housing 11 of the weight measurement device 10 that is configured to allow the device 10 to be selectively connected to a constant power source (e.g., a wall-outlet) such that the rechargeable internal power supply thereof may be charged. As shown, in various embodiments, the weight measurement device 10 may comprise a power switch 15, which may be configured to control the power supplied from the power supply to the aforementioned one or more components of the weight measurement device 10, as described herein.

In various embodiments, as illustrated in FIG. 2, a weight measurement device 10 may comprise a scale portion 100. In various embodiments, the scale portion 100 of the weight measurement device 10 may comprise a receiving tray 110, a lever assembly 120, and a force sensor 140. As described herein, the receiving tray 110 of the scale portion 100 may comprise a receiving tray bottom surface 111 configured to receive one or more objects. The receiving tray bottom surface 111 may be further configured to receive a weight force embodied as a pushing force generated by the weight of the one or more objects disposed thereon and disperse at least a portion of the weight force to each of the plurality of levers of the lever assembly 120. In various embodiments, the receiving tray 110 may further comprise an at least one sidewall defining a perimeter extending around a portion (e.g., an outer boundary) of the receiving tray so as to at least partially constrain the movement of an object disposed upon the receiving tray bottom surface 111 of the receiving tray 110 such that the object remains within the perimeter defined by the at least one sidewall 112. For example, the at least one sidewall 112 may be configured to extend along a perimeter of a measurement area of the receiving tray 110, as described herein. The receiving tray bottom surface 111 and/or the at least one sidewall 112 may define both the length and the width of the receiving tray 110.

As illustrated, the receiving tray 110 may be connected to a lever assembly 120 comprising a plurality of levers, such that the weight force received by the receiving tray bottom surface 111 of the receiving tray 110 may be transmitted to the plurality of levers of the lever assembly 120. For example, the entirety of the weight force received by the receiving tray bottom surface 111 of the receiving tray 110 may be transmitted to the plurality of levers such that each lever of the plurality of levers of the lever assembly 120 receives at least a portion of the weight force generated by the at least one object disposed upon the receiving tray 110. In various embodiments, each of the plurality of levers of the lever assembly 120 may be secured on a first end (e.g., a lever tray interface) to a portion of the receiving tray (e.g., a lever attachment point) and anchored on a second end (e.g., lever anchor point) to a portion of the housing 11 of the weight measurement device 10. Further, each of the plurality of levers may be positioned underneath the receiving tray 110 such that a portion of the weight force generated by an object on the receiving tray bottom surface 111 of the receiving tray 110 may be transmitted in a downward vertical direction to the respective lever tray interfaces of each of the plurality of levers, and any displacement of the receiving tray 110 in a corresponding vertical direction (e.g., z-direction) may be realized by each of the plurality of levers. As described herein, each of the plurality of levers may comprise a length that extends underneath a portion (e.g., a central portion) of the receiving tray bottom surface 111 of the receiving tray 110 between the corresponding lever tray interface and the lever anchor point. For example, in various embodiments, each of the plurality of levers may be configured to extend from a respective first side of the receiving tray 110, underneath a central portion of the receiving tray bottom surface 111 of the receiving tray 110, towards a respective opposite side of the receiving tray 110. In various embodiments, the lever assembly 120 may be arranged such that the respective lever tray interfaces of each of the plurality of levers are distributed about an outer portion of the receiving tray 110. Further, in various embodiments, the plurality of levers may be arranged in a stacked configuration, wherein the length of each of the plurality of levers extends along a respective at least substantially horizontal plane underneath at least a portion of the receiving tray bottom surface 111 through a common vertical axis such that at least a portion of each of the plurality of levers is aligned at a lever alignment axis 125. In various embodiments, the lever assembly 120 may further comprise a lever alignment component 126 configured to least partially constrain the movement of each of the plurality of levers so as to prevent the lever alignment axis 125 defined by the plurality of levers from shifting in either a lateral or angular direction. The lever alignment component 126 may receive a portion of a length of each of the plurality of levers and may be configured to secure the angular position of each of the plurality of levers relative to one another. For example, the lever alignment component 126 may be configured to at least partially define the range of motion of each of the plurality of levers of the lever assembly 120 so as to ensure that the lever alignment axis 125 remains aligned with the force sensor 140. In various embodiments, a bottom portion of the lever alignment component 126 may be configured to receive a collective lever force from one of the plurality of levers, as described herein. In such a circumstance, the lever alignment component 126 may be configured to transmit at least substantially all of the collective lever force received from the plurality of levers to the force sensor 140 in a downward vertical direction along the lever alignment axis 125

As illustrated, in various embodiments, the lever alignment axis 125 defined by the plurality of levers of the lever assembly 120 may be at least substantially aligned with a force sensor 140. In various embodiments, the force sensor 140 may be arranged within the interior housing portion 12 of the weight measurement device 10 in a position such that at least a portion of the force sensor 140 is aligned with (e.g., intersects) the lever alignment axis 125. The force sensor 140 may be engaged with the lever assembly 120 such that the weight force received by the receiving tray 110 and transmitted to the plurality of levers of the lever assembly 120 may be transmitted to the force sensor 140. In various embodiments, the force sensor 140 may be positioned underneath the lever assembly 120 such that the weight force received by the receiving tray 110 and transmitted to the lever assembly 120 may be further transmitted from the lever assembly 120 in a downward vertical direction to the force sensor 140 as a collective lever force. For example, the force sensor 140 may be positioned underneath the lever assembly 120 in various embodiments wherein the lever assembly 120 is configured is configured to multiply the total weight force transmitted to the force sensor 140. Alternatively, in various embodiments wherein the lever assembly 120 is configured to reduce the total weight force transmitted to the force sensor 140, for example, the force sensor 140 may be positioned above the lever assembly 120. In various embodiments, the entirety of the force received by the plurality of levers may be transmitted to the force sensor 140 in a downward vertical direction along the lever alignment axis 125. For example, where each of the plurality of levers is configured to receive a partial weight force (e.g., a portion of the weight force received by the receiving tray 110), the lever assembly 120 may be arranged such that each of the plurality of levers is configured to transmit a partial lever force corresponding to the partial weight force received by the respective lever to the force sensor 140. In such a circumstance, the total force transmitted from the lever assembly 120 to the force sensor 140 comprises a collective lever force defined at least in part by the sum of each of the respective partial lever forces transmitted by each of the plurality of levers, as described herein. In various embodiments, the force sensor 140 may comprise a receiving face configured to receive the collective lever force transmitted from the lever assembly 120. For example, at least a portion of the receiving face of the force sensor 140 may be aligned with the lever alignment axis 125 and may face in a direction that is at least substantially parallel to the lever alignment axis 125 such that the entirety of the collective lever force transmitted to the force sensor 140 from the lever assembly 120 in a downward vertical direction may be detected by the force sensor 140.

Further, in various embodiments, the force sensor 140 may further comprise a lever coupling component 127 aligned along the lever alignment axis and disposed between the force sensor 140 and the lever assembly (e.g., one of the plurality of levers and/or the lever alignment component 126). In such an exemplary configuration, the lever assembly may be configured to transmit at least substantially all of the collective lever force received from the plurality of levers to the lever coupling component 127 in a vertical direction along the lever alignment axis 125. In various embodiments, the force sensor 140 may be configured to receive at least substantially all of the collective lever force from the lever assembly via the lever coupling component 127 in a vertical direction along the lever alignment axis 125.

As described herein, the force sensor 140 may be constrained against movement in the vertical direction, such that the entirety of the collective lever force transmitted from the lever assembly 120 may be realized by the force sensor 140. In various embodiments, the scale portion 100 may comprise a force sensor dock element 141 configured to receive the force sensor 140 and secure the force sensor 140 in a preferred position within the internal housing portion 12 of the weight measurement device 10. For example, the force sensor dock element 141 may be configured to secure the force sensor 140 underneath both the receiving tray 110 and the lever assembly 120 such that the force sensor 140 may receive the collective lever force transmitted from the lever assembly 120. The force sensor dock element 141 may secure the force sensor 140 in a position that is at least substantially aligned with the lever alignment axis 125, as described herein. Further, in various embodiments, the scale portion 100 may comprise internal circuitry 142 configured to be in electronic communication with the force sensor 140 and one or more other components of the weight measurement device 10, as described herein.

As illustrated in FIG. 2, the scale portion 100 of the weight measurement device 10 may be at least partially disposed within the internal housing portion 12. For example, the housing 11 may define a receiving tray opening 13 through which at least a portion of the receiving tray 110 may extended. The scale portion 100 may be positioned relative to the receiving tray opening 13 such that the receiving tray 110 is accessible to a user of the weight measurement device 10 from an external portion of the housing 11. The scale portion 100 may be configured such that in response to a variance in the weight force being applied to the receiving tray 110 (e.g., the removal and/or receipt of at least one object at the receiving tray 110), the receiving tray 110 may move in a substantially vertical direction relative to the receiving tray opening 13. As described herein, the receiving tray opening 13 may be defined at least in part by the plurality of sidewalls of the housing 11. In various embodiments, the housing 11 of the weight measurement device may further comprise one or more receiving tray stops 14 configured to at least partially restrict the range of motion of the receiving tray 110 in, for example, the vertical direction. For example, in various embodiments, in order to prevent overloading of the force sensor 140 and/or unwarranted removal of the receiving tray 110 from the interior portion of the housing 12, one or more receiving tray stops 14 may be disposed about the housing 11 and configured to engage a receiving tray 110 such that the receiving tray 110 may be prevented from being further displaced in a corresponding direction. For example, the one or more receiving tray stops 14 may be configured to define the maximum displacement of the receiving tray 110 in one or both of the positive and negative vertical directions.

In various embodiments, as illustrated in FIG. 2, a weight measurement device 10 may comprise a user interface portion 200. In various embodiments, the user interface portion 200 of the weight measurement device 10 may comprise a user interface display 201. The user interface display 201 may be configured to display weight measurement data and/or inventory measurement data generated by the weight measurement device 10 (e.g., a controller). As described herein, the weight measurement data and/or the inventory measurement data may correspond to an at least one object disposed upon the receiving tray 110 and may be based at least in part on a collective lever force received by the force sensor 140 in response to the weight of the at least one object being transmitted to the receiving tray 110. In various embodiments, the user interface display 201 may comprise a graphical user interface (GUI), and may include a display that may include a web user interface, a GUI application, a mobile application, a client device, or any other suitable hardware or software. In some embodiments, the user interface display 201 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms.

Figure 3A:
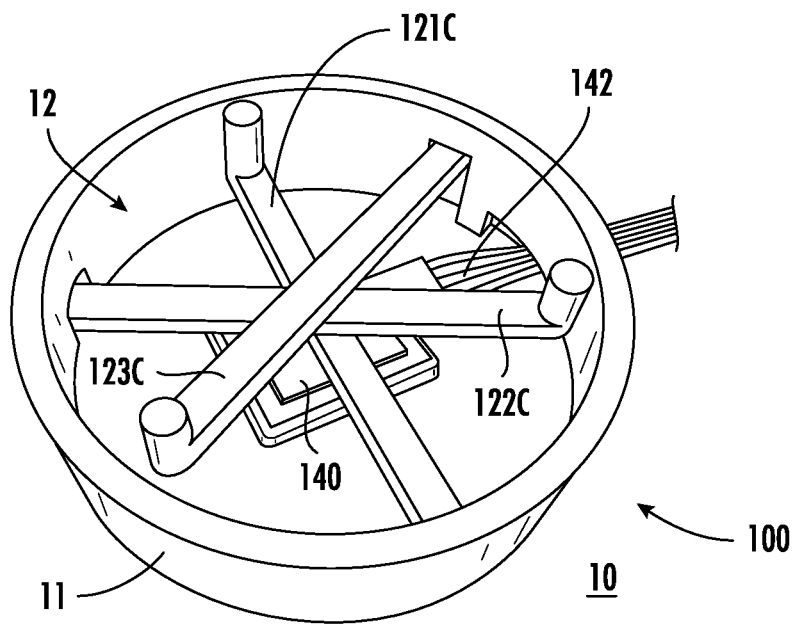
FIGS. 3A-3B illustrate various views of an exemplary apparatus in accordance with various embodiments.
Figure 3B:
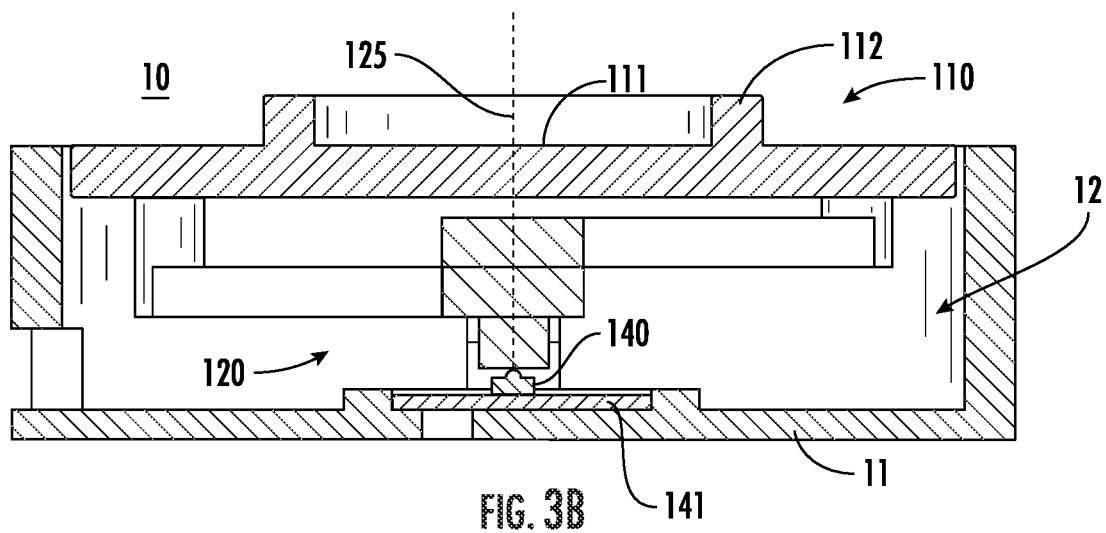

FIGS. 3A-3B illustrate various views of an exemplary apparatus in accordance with various embodiments. In particular, FIGS. 3A and 3B illustrate a perspective view and a side view, respectively, of an exemplary weight measurement device 10. The weight measurement device 10 may be configured to generate weight measurement data and/or inventory measurement data corresponding to a wide variety of objects of different types, shapes, and sizes in a variety of different environment, each having unique size and/or shape specifications. As such, the weight measurement device 10 described herein may be designed to comprise one of a variety of different shapes and/or different sizes in order to accommodate the unique circumstances of a particular use. As illustrated in FIGS. 3A and 3B, in various embodiments, the weight measurement device 10 may comprise a housing having a substantially cylindrical shape defined at least in part by a substantially circular cross-sectional area. In various embodiments, the scale portion 100 of the weight measurement device 100 may be configured to correspond to the shape of the housing 11 of the weight measurement device 10. For example, the receiving tray 110 may comprise a shape corresponding to the cross-sectional shape of the housing 11 (e.g., the receiving tray opening). As shown, in various embodiments, the plurality of levers of the lever assembly may comprise three levers, each being anchored to the housing 11 at a respective anchor point. As described herein, the plurality of levers may be arranged within an internal housing portion 12 such that the respective anchor points of each of the levers are evenly distributed about a perimeter of the internal housing portion. For example, each of the evenly distributed anchor points may be at least substantially equidistant from at least two of the other anchor points of the plurality of levers. As described herein, each of the three levers of the plurality may comprise a lever arm extending from the respective anchor point across a central portion of the internal housing portion 12 of the weight measurement device 10 to a respective lever tray interface. The respective lever tray interfaces of the plurality of levers may each be configured to engage a receiving tray 110 at a corresponding lever attachment point of the receiving tray 110, such that the receiving tray 110 may be positioned on top of the lever assembly. In various embodiments, the lever arms 121C, 122C, 123C of each of the three levers may define the length of the respective lever. As shown in FIG. 3A, the three levers of the plurality of levers may be arranged such that lever arms 121C, 122C, 123C of each of the three levers extends along a respective horizontal plane through a common lever alignment axis 125 such that at least a portion of each of the lever arms 121C, 122C, 123C is aligned at the lever alignment axis 125. In various embodiments, the lever alignment axis 125 may correspond to a central axis of the weight measurement device 10 extending through a substantially central portion of the housing 11 in a vertical direction. The force sensor 140 of the scale portion 100 may be positioned within the internal housing portion 12 beneath the lever assembly 120 (e.g., the plurality of levers) such that the displacement of the lever assembly 120 in the vertical direction caused by the weight of an object disposed upon the receiving tray 110 causes a force to be transmitted from the lever assembly 120 to the force sensor 140, as described herein. As illustrated in FIG. 3B, the force sensor 140 may be arranged so as to be at least substantially aligned with the lever alignment axis 125 defined by the three lever arms 121C, 122C, 123C. In various embodiments, the plurality of levers of the lever assembly 120 may comprise three or more levers.

Figure 4:
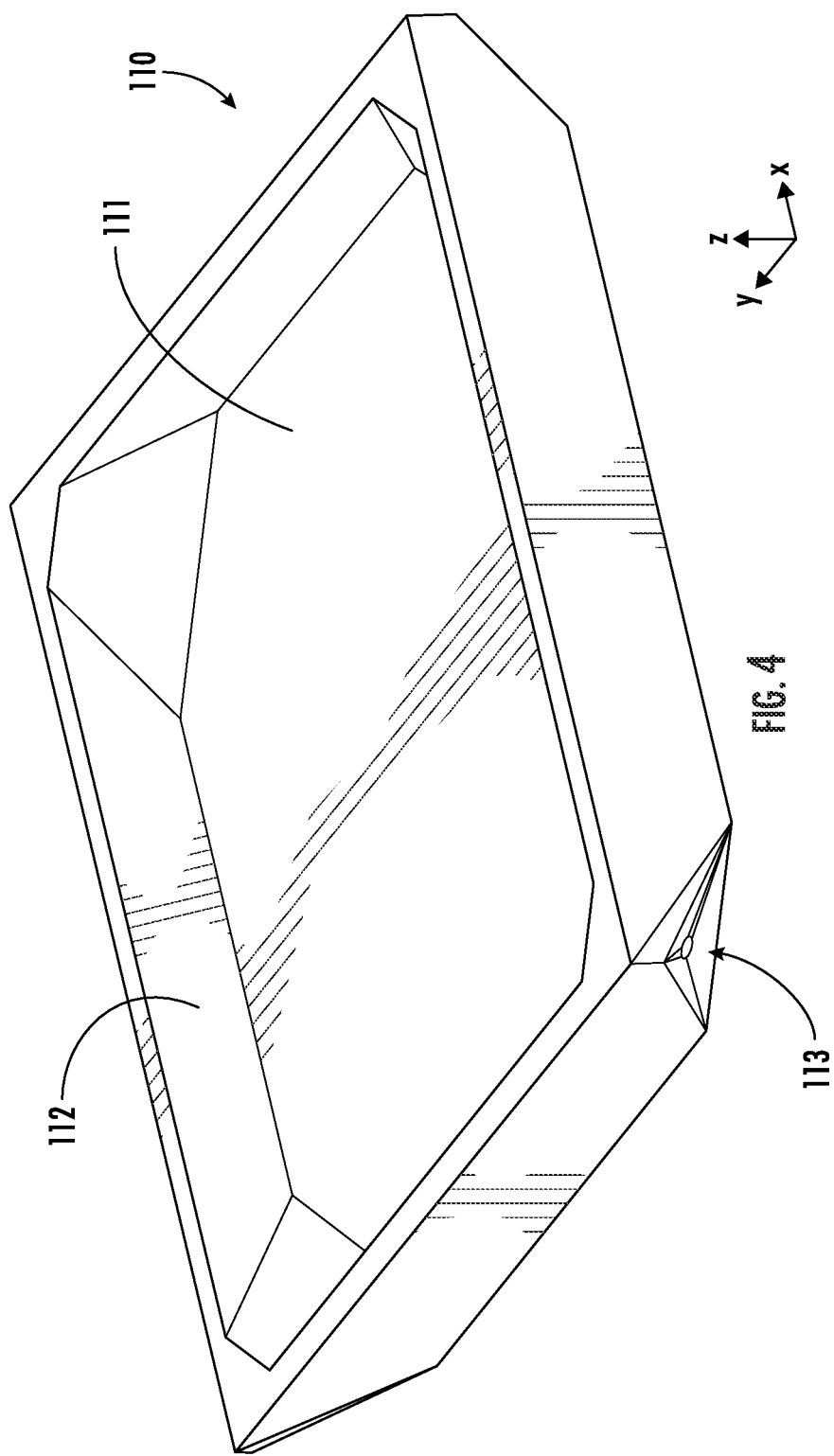
FIG. 4 illustrates a perspective view of various components of an exemplary apparatus in accordance with various embodiments.

FIG. 4 illustrates a perspective view of various components of an exemplary apparatus in accordance with various embodiments. In particular, FIG. 4 illustrates a perspective view of an exemplary receiving tray 110 of a weight measurement device 10 described herein. The receiving tray 110 may define a part of the scale portion 100 of the weight measurement device 10. As illustrated, the receiving tray 110 may comprise a receiving tray bottom surface 111, at least one sidewall 112, and a plurality of lever attachment points 113. In various embodiments, the receiving tray 110 may be configured to receive one or more objects and contain the one or more objects within a measurement area, as described herein, such that the weight of the one or more objects may be determine by the weight measurement device 10. In various embodiments, the receiving tray may be made at least in part of rigid materials (e.g., rigid metal materials, rigid plastic materials, and/or the like) and/or resilient materials (e.g., resilient polymeric materials).

In various embodiments, the receiving tray bottom surface 111 of the receiving tray 110 may comprise either a substantially flat surface or a surface having a concave curvature (e.g., extending in a downward vertical direction) relative to a substantially horizontal plane. The receiving tray bottom surface 111 may comprise an outer perimeter extending around the periphery thereof. For example, wherein the receiving tray 110 comprises a substantially rectangular shape, the outer perimeter of the receiving tray bottom surface 111 may define the length and width of the receiving tray 110. For example, in various embodiments, the receiving tray 110 may comprise an at least substantially square perimeter having a length and a width of at least substantially between 5 mm and 650 mm (e.g., approximately 2.5 inches). In various embodiments, the length, width, and/or the like of the weight measurement device and/or the receiving tray may correspond, at least in part, the configuration of the lever assembly and/or the force range of the force sensor, as described herein. In addition to the total weight of the one or more objects disposed within the receiving tray 110, the total weight of the lever assembly, which may be defined at least in part by, for example, the number of levers included in the plurality of levers and the various lengths and/or materials (e.g., weights) thereof, may act on the force sensor so as to occupy a portion of the capacity of the force sensor. As such, the size of the receiving tray may be configured based at least in part on the configuration of the lever assembly, which may be designed to avoid substantially limiting the effective force range of the force sensor with respect to measuring a force generated by an object weight received at the receiving tray 110. In various embodiments, the size of one or more components of the weight measurement device (e.g., the receiving tray 110) may be proportion at least in part to the size and/or capacity of the force sensor.

In various embodiments, the receiving tray 110 may be configured such that the one or more objects received by the receiving tray 110 may be disposed upon the receiving tray bottom surface 111. In such a circumstance, the weight of the one or more objects may generate a weight force, the entirety of which may be transmitted to the receiving tray bottom surface 111 on which the one or more objects are disposed. The receiving tray 110 may be configured to disperse the weight force received by the receiving tray bottom surface 111 to each of the plurality of lever attachment points 113, such that at least a portion of the weight force may be transmitted to each of the plurality of levers of the lever assembly, as described herein. In various embodiments, at least a portion of the receiving tray bottom surface 111 may comprise an adhesive an adhesive (i.e. sticky) material, such as, for example, a gel, a tape, and/or the like, configured to receive and retain the one or more objects (e.g., particulate matter within a volume of fluid, such as air) disposed thereon.

In various embodiments, the receiving tray 110 may further comprise at least one sidewall 112 defining a sidewall perimeter extending around at least a portion of the receiving tray bottom surface 111. The at least one sidewall 112 may be configured to retain the at least one object disposed upon the receiving tray bottom surface 111 of the receiving tray 110 within an area defined by the sidewall perimeter of the at least one sidewall 112. As such, the at least one sidewall may comprise a number of sidewalls corresponding to the number of peripheral edges of the receiving tray bottom surface 111. For example, the at least one sidewall 112 may be arranged such that the sidewall perimeter extends along the outer perimeter of the receiving tray bottom surface 111 of the receiving tray 110. Alternatively, the at least one sidewall 112 may be configured such that the sidewall perimeter is arranged entirely within the outer perimeter of the receiving tray bottom surface 111, thereby selectively reducing the area of the receiving tray bottom surface 111 upon which an object disposed thereon may be distributed. In various embodiments, the at least one sidewall 112 may be configured in an at least substantially vertical configuration or, alternatively, may comprise an angled interior surface configured to encourage the one or more objects disposed upon the receiving tray bottom surface 111 to be collected toward a center portion of the receiving tray bottom surface 111.

In various embodiments, the plurality of lever attachment points 113 may each be configured to receive a corresponding lever tray interface of the plurality of levers included in the lever assembly. As a non-limiting example, in various embodiments, a lever attachment point 113 may comprise a socket extending into a thickness of the receiving tray 110 and configured such that a lever tray interface of one of the plurality of levers may be inserted therein. Although illustrated in FIG. 4 as a socket element, it should be understood that a lever attachment point 113, as described herein, may be embodied as any means of securing a lever tray interface from the lever assembly to the receiving tray 110, so as to prevent relative motion therebetween. For example, the plurality of lever attachment points 113 may be defined by a number of lever attachment points corresponding to the number of levers included in the lever assembly, as described herein. The plurality of lever attachment points 113 may be positioned about the receiving tray 110 such that, upon receiving the corresponding plurality of lever tray interfaces, the receiving tray 110 may be positioned on top of the lever assembly.

As illustrated in FIG. 4, the receiving tray 110 may comprise an at least substantially rectangular (e.g., square) shape, defined at least in part by the outer perimeter of the receiving tray bottom surface 111. As shown, the at least one sidewall 112 may comprise four sidewalls, each sidewall corresponding to a respective peripheral edge of the receiving tray bottom surface 111. As illustrated, in various embodiments wherein each of the plurality of sidewalls comprises an angled interior surface, the plurality of sidewalls may further comprise corner portions so as to define a substantially continuous angled sidewall perimeter. In various embodiments, the plurality of lever attachment points 113 may be evenly distributed about a perimeter of the receiving tray 110. For example, where the receiving tray 110 comprises an at least substantially rectangular (e.g., square) shape the plurality of lever attachment points may comprise four lever attachment points 113, each positioned at a respective corner of the receiving tray 110. As described herein, in such an exemplary circumstance, the receiving tray 110 may be configured to transmit a distinct partial weight force to each of the plurality of levers at the corresponding lever attachment point. Each of the partial weight forces may be transmitted from a lever attachment point to the corresponding lever tray interface coupled thereto in a substantially downward vertical direction (e.g., the negative z-direction). As described herein, the magnitude of each of the respective partial weight forces may be based at least in part on the magnitude of the weight force generated by the one or more objects disposed upon the receiving tray 110 and the location of the center of gravity of the one or more objects relative to lever attachment point 113 through which the respective partial weight force is being transmitted.

Figure 5:
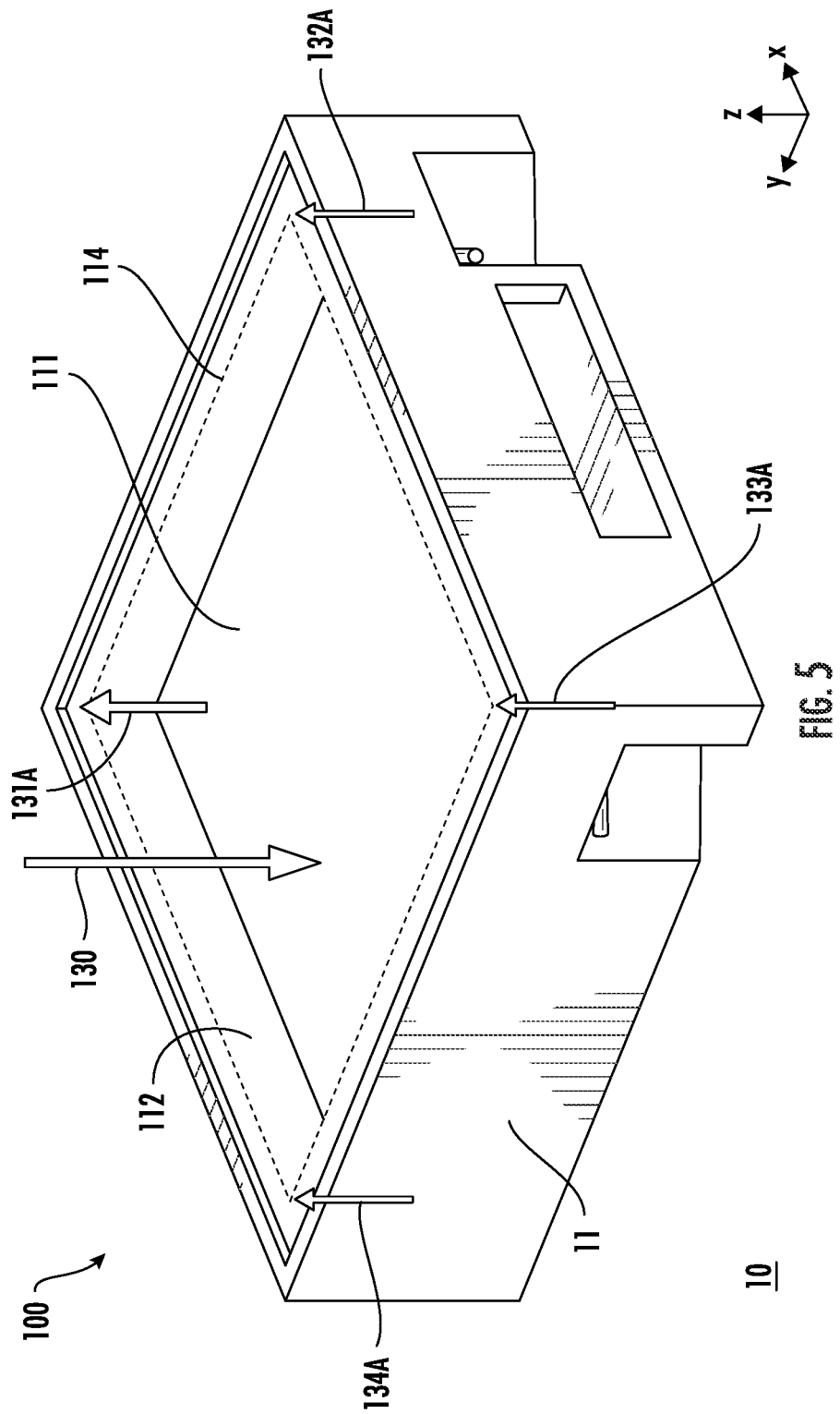
FIG. 5 illustrates a perspective view of an exemplary apparatus in accordance with various embodiments.

In various embodiments, the scale portion 100 of the weight measurement device 10 may be configured such that a partial weight force transmitted from the receiving tray 110 to a corresponding lever of the plurality of levers included in the lever assembly may generate a reciprocal partial weight reaction force that acts on the corresponding lever attachment point from the corresponding lever (e.g., via a respective lever tray interface) in a substantially opposite direction. As illustrated in FIG. 5, the weight force 130 generated by an object on the receiving tray bottom surface 111 of the receiving tray 110 may cause the receiving tray 110 to be displaced in a corresponding downward vertical direction (e.g., the negative z-direction). In such an exemplary circumstance, a partial weight force may be transmitted from each of the plurality of lever attachment points of the receiving tray 110 to a corresponding lever of the plurality of levers in the downward vertical direction. As described herein, the lever assembly of the scale portion 100 may be configured to apply reciprocal partial weight reaction forces to each of the plurality of lever attachment points the receiving tray 110, in response. For example, as shown, the scale portion 100 may comprise four lever attachment points, each engaged with a corresponding lever tray interface such that the four lever tray interfaces may each receive a partial weight force and transmit a reciprocal partial weight reaction force 131A, 132A, 133A, 134A to the lever attachment point engaged therewith in response to a weight force 130 being applied to the receiving tray 110. In various embodiments, as described herein, the magnitude of the weight force 130 may comprise the sum of the partial weight forces, and thus, may define the sum of the reciprocal partial weight reaction forces 131A, 132A, 133A, 134A.

In various embodiments, the plurality of lever attachment points may collectively define the geometric corners of a perimeter extending around at least a portion of the receiving tray bottom surface 111 of the receiving tray 110. As described herein, the portion of the receiving tray bottom surface 111 within the perimeter having geometric corners defined by the plurality of lever attachment points may comprise a measurement area 114. That is, in various embodiments, a measurement area 114 may be defined by the portion of the receiving tray bottom surface 111 within the perimeter defined by the plurality of lever attachment points. In various embodiments, the measurement area 114 may comprise a number of sides corresponding to the number of levers included in the plurality of levers of the lever assembly. For example, as shown in FIG. 5, where the lever assembly of the scale portion 100 comprises four levers, as referenced above, the measurement area 114 may have four sides defining, for example, a square perimeter. As described herein, the scale portion 100 (e.g., the lever assembly) may be configured such, in various embodiments wherein the collective center of gravity of the one or more objects disposed upon the receiving tray bottom surface 111 of the receiving tray 110 is positioned with the measurement area 114, the net moment of the weight force 130 realized by the receiving tray 110 will be at least substantially zero. In various embodiments, where the net moment realized by the receiving tray 110 is at least substantially zero, the receiving tray 110 may exhibit substantially no motion in both the lateral and angular directions, thereby being confined to movement in only a vertical direction (e.g., the positive and/or negative z-directions). By being configured such that the range of motion of the receiving tray 110 is limited to movement in a vertical direction, the scale portion 100 of the weight measurement device 10 may facilitate the displacement of the receiving tray 110 relative to the receiving tray opening, for example, without the receiving tray 110 physically engaging one or more of the sidewalls of the housing 11.

Figure 6:
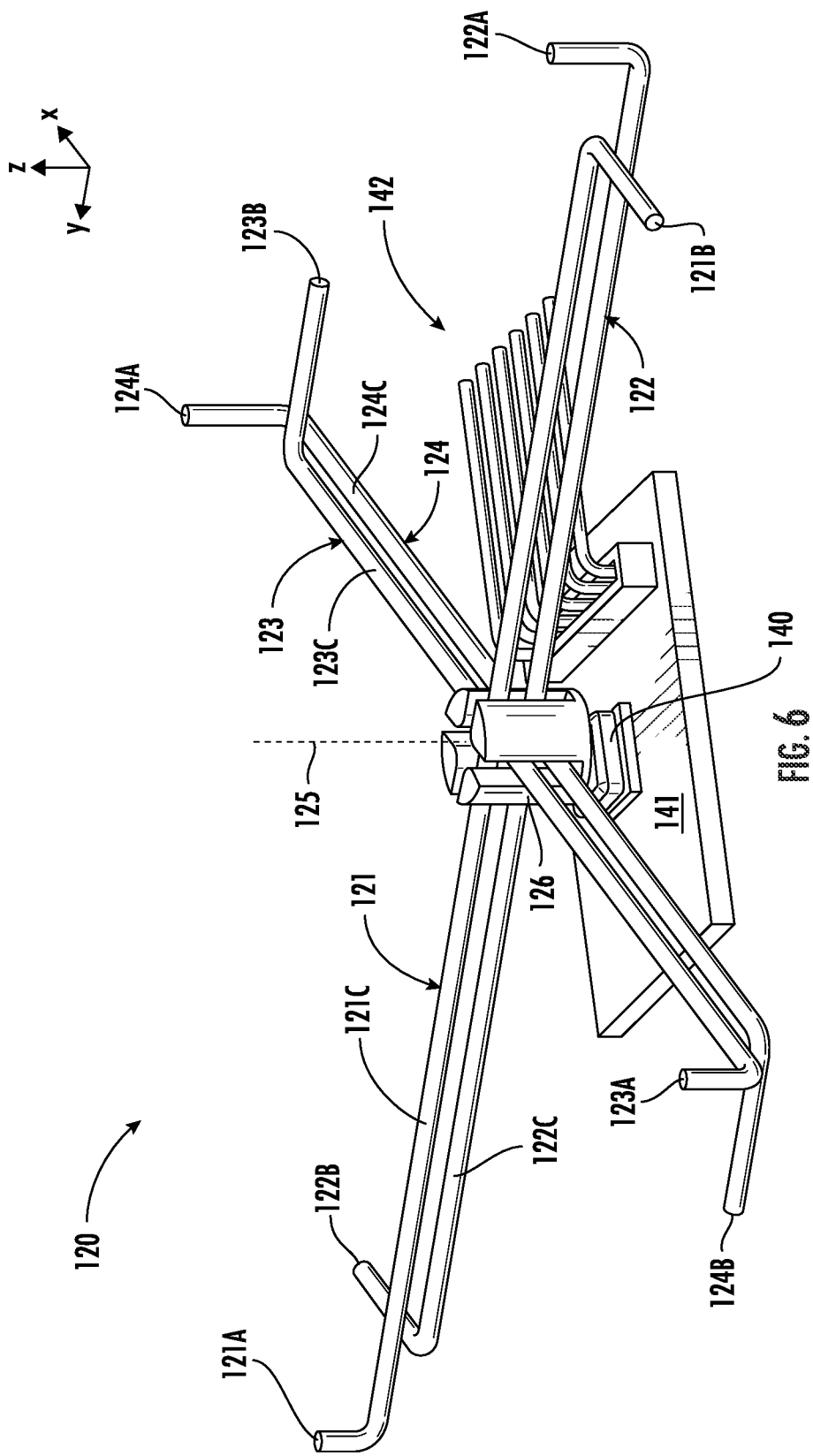
FIG. 6 illustrates a perspective view of various components of an exemplary apparatus in accordance with various embodiments.

FIG. 6 illustrates a perspective view of various components of an exemplary apparatus in accordance with various embodiments. In particular, FIG. 6 illustrates a perspective view of a lever assembly 120 and a force sensor 140 operatively connected thereto. In various embodiments, the lever assembly 120 may comprise a plurality of levers. The weight measurement device 10 may be configured to utilize the plurality of levers of the lever assembly 120 to convert a weight force embodied as a point force or an area force applied to the receiving tray of the scale portion into a singular point force (e.g., a collective lever force) realized by a force sensor 140. As described herein, in various embodiments, the collective lever force transmitted to the force sensor 140 comprises either a multiple of the weight force or a fraction of the weight force, based at least in part on the configuration of the plurality of levers relative to the position of the force sensor 140 (e.g., the respective lever ratios).

By way of example, it should be understood that a lever assembly comprising a single lever may be used to mechanically amplify or reduce the amount of a point force received at a receiving tray that is transmitted to a force sensor 140 positioned along the lever arm of the singular lever, as described herein. Similarly, it should be further understood that in the exemplary weight measurement device 10 described herein, a lever assembly comprising two levers may define a measurement axis extending between the two respective lever tray interfaces, such that a point force transmitted to the receiving tray at a point along the measurement axis may be mechanically amplified or reduced by the lever assembly 120 before being transmitted to a force sensor 140 positioned along the lever arm of one of the two levers. Accordingly, as described herein, the plurality of levers of the lever assembly may comprise three or more levers such that the lever assembly 120 may receive a weight force that has been transmitted to the receiving tray within a measurement area (e.g., defined in part by the positioning of the lever tray interfaces of the three or more levers) and transmit a corresponding collective lever force to the force sensor 140, wherein the collective lever force comprises a mechanically amplified or reduced portion of the weight force, depending on the position of the force sensor 140 relative to the plurality of levers. In various embodiments, the plurality of levers may comprise, for example, three levers, four levers, six levers, nine levers, ten levers, and/or the like, based at least in part on the various characteristics and/or performance specifications of the weight measurement device 10. For example, the plurality of levers may include more than three, preferably four or more, and most preferably between four and ten levers. In various embodiments, as described herein, the plurality of levers may be arranged in a vertical stack configuration. For example, in various embodiments wherein the plurality of levers is defined by an even number of lever, the plurality of levers of the vertical stack configuration may comprise a stacked arrangement. Alternatively, in various embodiments wherein the plurality of levers is defined by an odd number of lever, the plurality of levers of the vertical stack configuration may comprise a staggered arrangement.

In various embodiments, each of the plurality of levers may be made of one or more materials having various material properties and/or characteristics based at least in part on one or more weight measurement device specifications. For example, each of the plurality of levers may be selectively designed so as to optimize the deflection distance and/or force transmission capabilities of the lever in light of the particular configuration of the scale portion 100 of the weight measurement device 10 defined, in part, by the plurality of levers. For example, in various embodiments, the lever material may comprise either a substantially rigid material (e.g., steel tubing) or substantially flexible material (e.g., copper wire). Further, as described herein, each of the levers may be designed to comprise various cross-sectional areas, shapes, lengths, tempers and/or the like in order to facilitate the operability of the lever assembly 120 within the performance specifications of a particular weight measurement device 10.

As illustrated in FIG. 6, the plurality of levers of the lever assembly 120 may comprise four levers 121, 122, 123, 124. Each of the plurality of levers may comprise a lever tray interface 121A, 122A, 123A, 124A, a lever attachment portion 121B, 122B, 123B, 124B, and a lever arm 121C, 122C, 123C, 124C extending between the corresponding lever tray interface and, at least, the lever alignment axis, as described herein. In various embodiments, a lever tray interface 121A, 122A, 123A, 124A may comprise a portion of a lever that is configured to engage a portion of the receiving tray (e.g., a lever attachment point) so as to couple the lever to the portion of the receiving tray engaged therewith. For example, in various embodiments wherein the receiving tray comprises a lever attachment point embodied as a socket, the lever tray interface 121A may comprise an extension of the corresponding lever arm 121C that is configured to be inserted into the lever attachment point. In various embodiments, a lever tray interface 121A may comprise a portion of a lever that extends from the lever arm 121C at an angle relative to the length of the lever (e.g., along the lever arm 121C). In various embodiments, the lever tray interface 121A may extend from the lever arm 121C in a substantially upward vertical direction at an angle of 90 degrees relative to the corresponding lever arm 121C. Alternatively, the lever tray interface 121A may from the lever arm 121C in a direction that is at least partially upward and inward at an angle of less than 90 degrees relative to the corresponding lever arm 121C, as described herein. In such a circumstance, the lever tray interface 121A may extend in a diagonally upward and inward direction relative to the corresponding lever arm 121C such that, when inserted into the corresponding lever attachment point of the receiving tray, the levers may stabilize the receiving tray and minimize the lateral movement of the tray in a direction along the length of the lever.

In various embodiments, the plurality of levers 121, 122, 123, 124 of the lever assembly 120 may be arranged such that the lever tray interfaces 121A, 122A, 123A, 124A thereof are evenly distributed about a central vertical axis such that the angular distance between each of the adjacent lever tray interfaces relative to the central vertical axis is at least substantially the same. As described herein, the plurality of lever tray interfaces may be evenly distributed and arranged proximate an outer perimeter of a receiving tray of the scale portion of the weight measurement device in order to maximize the measurement area of the scale portion. For example, in an embodiment wherein the plurality of levers includes four levers, as shown, the angular distance between adjacent lever tray interfaces may be 90 degrees. Alternatively, as a non-limiting example, in an embodiment wherein the plurality of levers includes three levers, as shown, the angular distance between each of the adjacent lever tray interfaces may be 120 degrees. In various embodiments, the plurality of lever tray interfaces may be unevenly distributed about a central vertical axis such that the angular distance between each of the adjacent lever tray interfaces relative to the central vertical axis is at least substantially different. For example, in such an exemplary circumstance, the plurality of levers may be selectively misaligned so as to maximize a range of motion of the respective levers while still avoiding unwarranted contact between the plurality of levers at a point other than the lever alignment axis 125.

In various embodiments, each of the plurality of levers may further comprise a lever anchor point arranged at an end portion of a corresponding lever arm and configured to be fixedly secured to a portion of the housing of the weight measurement device. As described herein, the lever anchor point 121B, 122B, 123B, 124B of each of the plurality of levers may be at least substantially fixed in one or more directions (e.g., the x-direction, y-direction, z-direction, and/or the like). In various embodiments, for example, wherein the lever assembly 120 is configured to reduce the total weight force transmitted to the force sensor 140, the lever anchor point 121B, 122B, 123B, 124B of each of the plurality of levers may be positioned along a corresponding lever arm 121C, 122C, 123C, 124C in between the corresponding lever tray interface 121A, 122A, 123A, 124A and the lever alignment axis 125, as described herein. In such an exemplary circumstance, each lever anchor point 121B, 122B, 123B, 124B may be secured to the housing 11 by a fastening means configured to allow for the rotational movement of one or more components of the lever assembly 120 in at least one direction.

As described herein, in various embodiments, the lever arm 121C, 122C, 123C, 124C of each of the plurality of levers may extend between a lever tray interface 121A, 121A, 123A, 124A of a corresponding lever and the lever alignment axis 125. Further, in various embodiments, for example, wherein the lever assembly 120 is configured to multiply the total weight force transmitted to the force sensor 140, the lever arm 121C, 122C, 123C, 124C of each of the plurality of levers may extend between a lever anchor point 121B, 121B, 123B, 124B and a lever tray interface 121A, 121A, 123A, 124A of a corresponding lever.

As illustrated in FIG. 6, the plurality of levers of the lever assembly 120 may be arranged such that each of the lever arms 121C, 122C, 123C, 124C extends from a first side of the scale portion of the weight measurement device inward along a substantially horizontal plane through a vertical axis extending from the receiving face of the force sensor (e.g., positioned at substantially central portion of the scale portion) and towards an opposite side of the scale portion. The respective lever arms 121C, 122C, 123C, 124C may each be arranged within a corresponding horizontal plane. For example, in the illustrated embodiment, the lever arms 121C, 122C, 123C, 124C of the four levers may respectively extend along four distinct horizontal planes, each of the four horizontal planes being arranged parallel to one another. As described herein, although illustrated as extending through a substantially central portion of the scale portion, each of the plurality of levers may be configured to extend in a direction towards a substantially non-central portion of the scale portion based at least in part on the arrangement of the force sensor 140, and thus, the lever alignment axis 125. As described herein, in an exemplary circumstance wherein the force sensor 140 is not aligned with a central vertical axis of the scale portion of the weight measurement device, the plurality of levers may each be configured so as to extend in a direction towards the lever alignment axis 125 that is aligned with the non-centralized force sensor 140.

In various embodiments, the lever assembly 120 may be configured such that the plurality of levers are arranged in a vertical stack configuration, wherein each of the plurality of lever arms 121C, 122C, 123C, 124C extends along a respective horizontal plane through a common vertical axis such that at least a portion of the length of each lever arm 121C, 122C, 123C, 124C is aligned at a lever alignment axis 125. In various embodiments, a portion of a lever arm proximate the lever alignment axis 125 may comprise a variable cross-section geometry such that the portion of the lever arm may be configured to at least partially receive an adjacently stacked lever arm within the variable cross-section geometry so as to facilitate a stable interlocking configuration of the plurality of levers. In such a configuration, the plurality of levers may comprise an uppermost lever 121 arranged on the top of the vertical stack and a lowermost lever 124 arranged on the bottom of the vertical stack, with the remaining levers 122, 123 of plurality of levers being stacked therebetween. As described herein, the stacked configuration of the plurality of levers may enable the transfer of a non-point force received by the receiving tray (e.g., a weight force) to a single point force (e.g., a collective lever force), as described herein.

In various embodiments, the lever alignment axis 125 defined by the plurality of levers of the lever assembly 120 may be at least substantially aligned with a force sensor 140. For example, in various embodiments wherein the force sensor is aligned with a central vertical axis of the scale portion of the weight measurement device, the lever alignment axis 125 may be positioned in an at least substantially central portion of the scale portion (e.g., substantially coaxial with the force sensor 140). In various embodiments, the force sensor 140 may comprise a single piezo-resistive force sensor, such as, for example, a five-newton force sensor, that is fixedly secured within the scale portion of the weight measurement device in a position at least substantially beneath the lever assembly 120. The force sensor 140 may be configured to receive a force transmitted from the lever assembly 120. The force sensor 140 may be configured to operate with a high degree of resolution so as to accurately detect miniscule variances in a force being applied thereto. For example, the force sensor may comprise an analog to digital converter (ADC) to facilitate precise sensor output. In various embodiments, the scale portion of the weight measurement device may be configured such that the force sensor 140 may detect a weight force applied at the receiving tray corresponding to an at least 0.5 gram object (e.g., a 2.0 gram object) disposed thereon. In various embodiments, the force sensor 140 may be coupled to a force sensor dock element 141 configured to constrain the force sensor 140 against movement in the vertical direction and secure the force sensor in the x-y plane such that at least a portion of the force sensor 140 remains aligned with the lever alignment axis 125. For example, the 141 may comprise a printed control board (PCB). As described herein, the force sensor 140 and/or the 141 may be in electronic communication with internal circuitry 142, which may enable the communication between the force sensor 140 and the controller of the weight measurement device such that forces received by the force sensor 140 may be communicated to the controller and converted into weight measurement data and/or inventory measurement data, as described herein.

In various embodiments, the lever assembly 120 may be configured to receive an entirety of a weight force applied to a receiving tray in the form of a plurality of partial weight forces transmitted, respectively, to each of a plurality lever tray interfaces 121A, 122A, 123A, 124A of the plurality of levers 121, 122, 123, 124, wherein the sum of the plurality of partial weight forces is at least substantially equal to the weight force. Further, in various embodiments, the force sensor 140 may be aligned with the lever alignment axis 125 and engaged with the lever assembly 120 so as to be operatively connected to one of the plurality of levers (e.g., the lowermost lever 124) arranged in a vertical stack configuration such that the force sensor 140 may define a fulcrum point intersecting the lever alignment axis 125. The force sensor 140 may be configured to receive a single point force acting from the lever assembly 120 in a vertical direction along the lever alignment axis 125. For example. In various embodiments wherein the lever assembly is configured to multiply the total weight force transmitted to the force sensor 140, the force sensor 140 may be aligned with the lever alignment axis 125 and engaged with the lever assembly 120 so as to be operatively connected to the lowermost lever 124 of the plurality of levers arranged in a vertical stack configuration such that the force sensor 140 may define an intermediate fulcrum point at the portion of the lever arm 124C intersecting the lever alignment axis 125, In such a configuration, the force sensor 140 may be configured to receive a single point force acting from the lever assembly 120 in the downward vertical direction along the lever alignment axis 125. For example, the point force received by the force sensor 140 may comprise the collective lever force, as described herein.

Each of the plurality of levers may be configured to receive a partial weight force at the respective lever tray interface 121A, 122A, 123A, 124A and transmit a corresponding moment force from the portion of the corresponding lever arm aligned with the lever alignment axis 125 in a vertical direction to an adjacent portion of the lever stacked immediately thereunder. The moment force applied by a lever 121, 122, 123, 124 to an adjacent portion of the lever stacked immediately adjacent in a vertical direction along the lever alignment axis may define a partial lever force, as described herein. For example, in various embodiments wherein the lever assembly is configured to multiply the total weight force transmitted to the force sensor 140, the moment force applied by a lever 121, 122, 123, 124 to an adjacent portion of the lever stacked immediately thereunder in a downward vertical direction along the lever alignment axis may define the partial lever force. Alternatively, in various embodiments wherein the lever assembly is configured to reduce the total weight force transmitted to the force sensor 140, the partial lever force may be defined by the moment force applied by a lever 121, 122, 123, 124 to an adjacent portion of the lever stacked immediately thereabove in an upward vertical direction along the lever alignment axis. In various embodiments, the magnitude of the partial lever force may correspond at least in part to one or more of the magnitude of the weight force and the lever ratio of the corresponding lever, as described in further detail herein. In various embodiments, the collective lever force transmitted by the lever assembly 120 to the force sensor 140 may be based at least in part on a sum of each of the partial lever forces generated by the plurality of levers 121, 122, 123, 124, as described herein.

Figure 7:
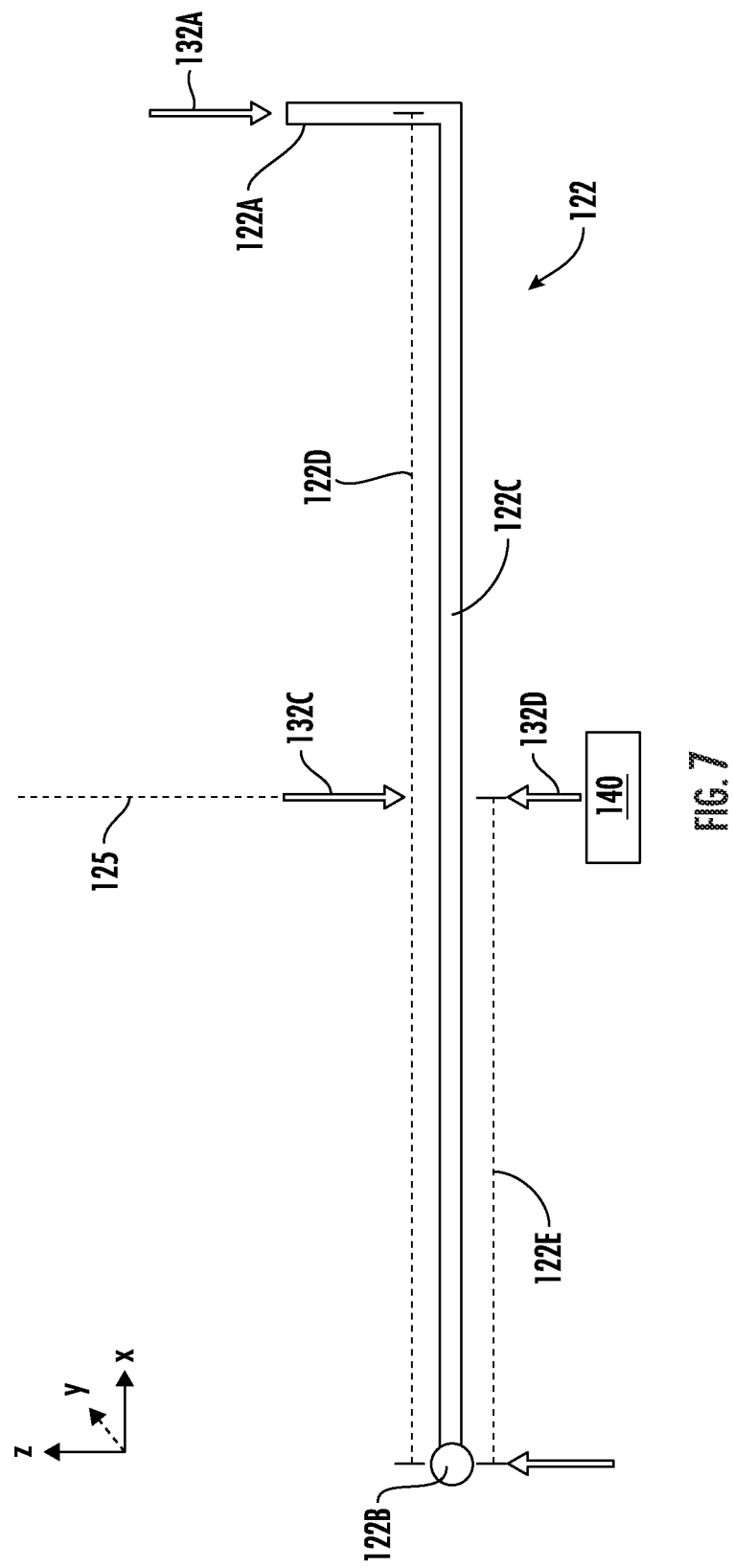
FIG. 7 illustrates an isolated side view of various components of an exemplary apparatus in accordance with various embodiments.

FIG. 7 illustrates an isolated side view of various components of an exemplary apparatus in accordance with various embodiments. In particular, FIG. 7 illustrates a side view of an exemplary lever 121 according to various embodiments described herein. As described herein, lever 122 comprises a lever tray interface 122A, a lever anchor point 122B, and a lever arm 122C extending between the lever tray interface 122A and the lever anchor point 122B. In various embodiments, the lever arm 122C may comprise a substantially linear profile extending directly between the lever tray interface 122A and the lever anchor point 122B along a horizontal axis such that the lever length 122D is defined by the lever arm 122C.

In various embodiments, the exemplary lever 122 may define one of a plurality of levers of a lever assembly, as described herein. For example, the lever assembly comprising the exemplary lever 122 may be configured such that the plurality of levers are arranged in a vertical stack configuration, wherein at least a portion of the length of each lever arm of the plurality of levers is aligned at a lever alignment axis 125. As illustrated in FIG. 7, in various embodiments wherein the lever assembly is configured to multiply the total weight force transmitted to a force sensor 140, the force sensor 140 may be aligned with the lever alignment axis 125 and engaged with the lever assembly so as to be operatively connected to the lowermost lever of the plurality of levers arranged in a vertical stack configuration. In such a configuration, the force sensor 140 may be configured to receive a single point force acting from the lever assembly in the downward vertical direction along the lever alignment axis 125. For example, the point force received by the force sensor 140 may comprise the collective lever force, as described herein. In such a configuration, wherein the force sensor 140 is constrained against movement in a vertical direction (e.g., z-direction), a reciprocal force equal and opposite to the collective lever force may be generated and transmitted from the force sensor 140 to the lever assembly so as to define a fulcrum point along each of the lever arms arranged in the vertical stack configuration at the respective portions of the lever arms that intersect the lever alignment axis 125. As illustrated, the fulcrum point of the exemplary lever 122 may be defined at least in part be lever fulcrum length 122E, which may comprise the distance along the linear lever arm 122C between the lever anchor point 122B and the lever alignment axis 125.

In various embodiments, upon at least one object being disposed within the measurement area of the receiving tray, as described herein, each of the plurality of levers of the lever assembly may receive a partial weight force 132A applied at the lever tray interface 122A from a corresponding lever attachment point of the receiving tray. The partial weight force received by the lever tray interface 122A may define a portion of the total weight force generated by the at least one object disposed upon the receiving tray, such that the sum of the magnitudes of each of the partial weight forces respectively received by the each of the plurality of levers may be at least substantially equal to the magnitude of the total weight force. As illustrated, the partial weight force 132A may be applied to the lever tray interface 122A in a downward vertical direction. As described herein, the fulcrum point generated by the force sensor 140 may cause the lever 122 to transmit a partial lever force (e.g., a moment force) in a vertical direction to an adjacent portion of a lever stacked immediately adjacent thereto. For example, in an exemplary embodiment wherein the lever assembly is configured to multiply the total weight force transmitted to a force sensor 140, the fulcrum point generated by the force sensor 140 and arranged along the length of the lever arm 122C may cause the lever 122 to transmit a partial lever force (e.g., a moment force) in a downward vertical direction to an adjacent portion of a lever stacked immediately thereunder.

In various embodiments, the partial lever force transmitted from the lever 122 may define the entirety of a lever fulcrum force transmitted from the lever 122 in a vertical direction along the lever alignment axis 125 to a lever stacked immediately adjacent thereto (e.g., immediately thereunder) in the vertical stack configuration, as described herein. For example, in an exemplary circumstance wherein the lever 122 comprises the lever arranged furthest from the force sensor 140 within the vertical stack configuration defined by the plurality of levers, the partial lever force generated by the lever 122 in response to receiving the partial weight force at the lever tray interface 122A may define the entirety of a lever fulcrum force (e.g., and, thus, the reciprocal lever fulcrum force 132D) transmitted to the lever stacked immediately adjacent thereto. Further, in an exemplary circumstance wherein the lever assembly is configured to multiply the total weight force transmitted to a force sensor 140, the lever 122 arranged furthest from the force sensor 140 within the vertical stack configuration may comprise the uppermost lever arranged on the top of the vertical stack configuration, such that the partial lever force generated by the lever 122 in response to receiving the partial weight force at the lever tray interface 122A may define the entirety of a lever fulcrum force (e.g., and, thus, the reciprocal lever fulcrum force 132D) transmitted to the lever stacked immediately thereunder in the vertical stack configuration. Alternatively, in an exemplary circumstance wherein the lever assembly is arranged beneath the force sensor 140 and configured to reduce the total weight force transmitted to a force sensor 140, the lever 122 arranged furthest from the force sensor 140 within the vertical stack configuration may comprise the lowermost lever arranged on the below the vertical stack configuration, such that the partial lever force generated by the lever 122 in response to receiving the partial weight force at the lever tray interface 122A may define the entirety of a lever fulcrum force (e.g., and, thus, the reciprocal lever fulcrum force 132D) transmitted to the lever stacked immediately thereabove in the vertical stack configuration. In such an exemplary circumstance, the magnitude of the lever fulcrum force 132D may be defined by the product of the partial weight force 132A and the ratio of the lever length 122D to the lever fulcrum length 122E (e.g., the lever ratio of the lever 122).

In various embodiments, the partial lever force transmitted from the lever 122 may define a portion of a lever fulcrum force transmitted from the lever 122 in a vertical direction along the lever alignment axis 125 to a lever stacked immediately adjacent thereto in the vertical stack configuration, as described herein. For example, in an exemplary circumstance wherein the lever assembly is configured to multiply the total weight force transmitted to a force sensor 140 and wherein the lever 122 is positioned immediately beneath the uppermost lever of the vertical stack configuration defined by the plurality of levers, the lever fulcrum force (e.g., and, thus, the reciprocal lever fulcrum force 132D) may comprise both the partial lever force generated by the lever 122 in response to receiving the partial weight force at the lever tray interface 122A and at least a portion of the lever fulcrum force transmitted to the lever 122 from the adjacent lever stacked immediately above the lever 122 in the vertical stack configuration, illustrated in FIG. 7 as an upper lever stack force 132C. In such a circumstance, wherein the respective lever ratios (e.g., the ratio of the lever length to the lever fulcrum length, as described herein) of the lever 122 and the adjacent lever stacked immediately above the lever 122 are equal, the magnitude of the lever fulcrum force (e.g., and, thus, the reciprocal lever fulcrum force 132D) transmitted from the lever 122 along the lever alignment axis 125 in a downward vertical direction to an adjacent lever stacked immediately below the lever 122 in the vertical stack configuration may be defined by the product of the lever ratio of the lever 122 and the sum of the partial weight force 132A and the partial weight force received by the adjacent lever stacked immediately above the lever 122. More generally, wherein the lever assembly is configured to multiply the total weight force transmitted to a force sensor 140, by way of further non-limiting example, where the respective lever ratios of the lever 122 and each of the plurality of levers stacked above the lever 122 in the vertical stack configuration are equal, the magnitude of the lever fulcrum force (e.g., and thus, the reciprocal lever fulcrum force 132D) transmitted from the lever 122 along the lever alignment axis 125 in a downward vertical direction to either an adjacent lever stacked immediately below the lever 122 in the vertical stack configuration may be defined by the product of the lever ratio of the lever 122 and the sum of the partial weight force 132A and each of the partial weight forces (e.g., the upper lever stack force 132C, as illustrated) received by a lever positioned above the lever 122 in the vertical stack configuration. For example, in various embodiments wherein the plurality of levers comprises four levers, the force transmitted from the lowermost lever to, for example, the force sensor 140 may be represented by equation below, wherein the partial weight force received by each of the four levers is $F_1$, $F_2$, $F_3$, and $F_4$, respectively:

$$F_{Sensor,4} = \left(\frac{\text{Lever Length}}{\text{Lever Fulcrum Length}}\right)(F_1 + F_2 + F_3 + F_4)$$

In various embodiments, the lever 122 may comprise the lever arranged nearest (e.g., operatively adjacent) the force sensor 140 within the vertical stack configuration defined by the plurality of levers such that the lever fulcrum force transmitted from the lever 122 in a vertical direction along the lever alignment axis 125 may comprise the collective lever force that may be received by the force sensor 140. Further, in an exemplary circumstance wherein the lever assembly is configured to multiply the total weight force transmitted to a force sensor 140, the lever 122 may comprise the lowermost lever arranged on the bottom of the vertical stack configuration such that the lever fulcrum force transmitted from the lever 122 in a downward vertical direction along the lever alignment axis 125 may comprise the collective lever force received by the force sensor 140. Alternatively, in an exemplary circumstance wherein the lever assembly is arranged beneath the force sensor 140 and configured to reduce the total weight force transmitted to force sensor 140 and force sensor 140, the lever 122 may comprise the uppermost lever arranged on the top of the vertical stack configuration such that the lever fulcrum force transmitted from the lever 122 in an upward vertical direction along the lever alignment axis 125 may comprise the collective lever force received by the force sensor 140.

As described herein, in various embodiments wherein the each of the plurality of levers arranged in a vertical stack configuration are defined at least in part by a common (e.g., shared) lever ratio, the collective lever force transmitted to the force sensor 140 by the lever assembly in response to one or more objects being disposed within the measurement area of a receiving tray may comprise the product of the common lever ratio and the weight force transmitted from the one or more objects to the receiving tray. In various embodiments, the common lever ratio of the plurality of levers of the lever assembly may be selectively configured to either increase or decrease the mechanical advantage facilitated by the lever assembly. For example, the plurality of levers and/or the force sensor 140 may be selectively configured such that the common lever ratio may either amplify or reduce the amount of force transmitted by the lever assembly to the force sensor 140 by a factor corresponding to said common lever ratio.

Figure 8:
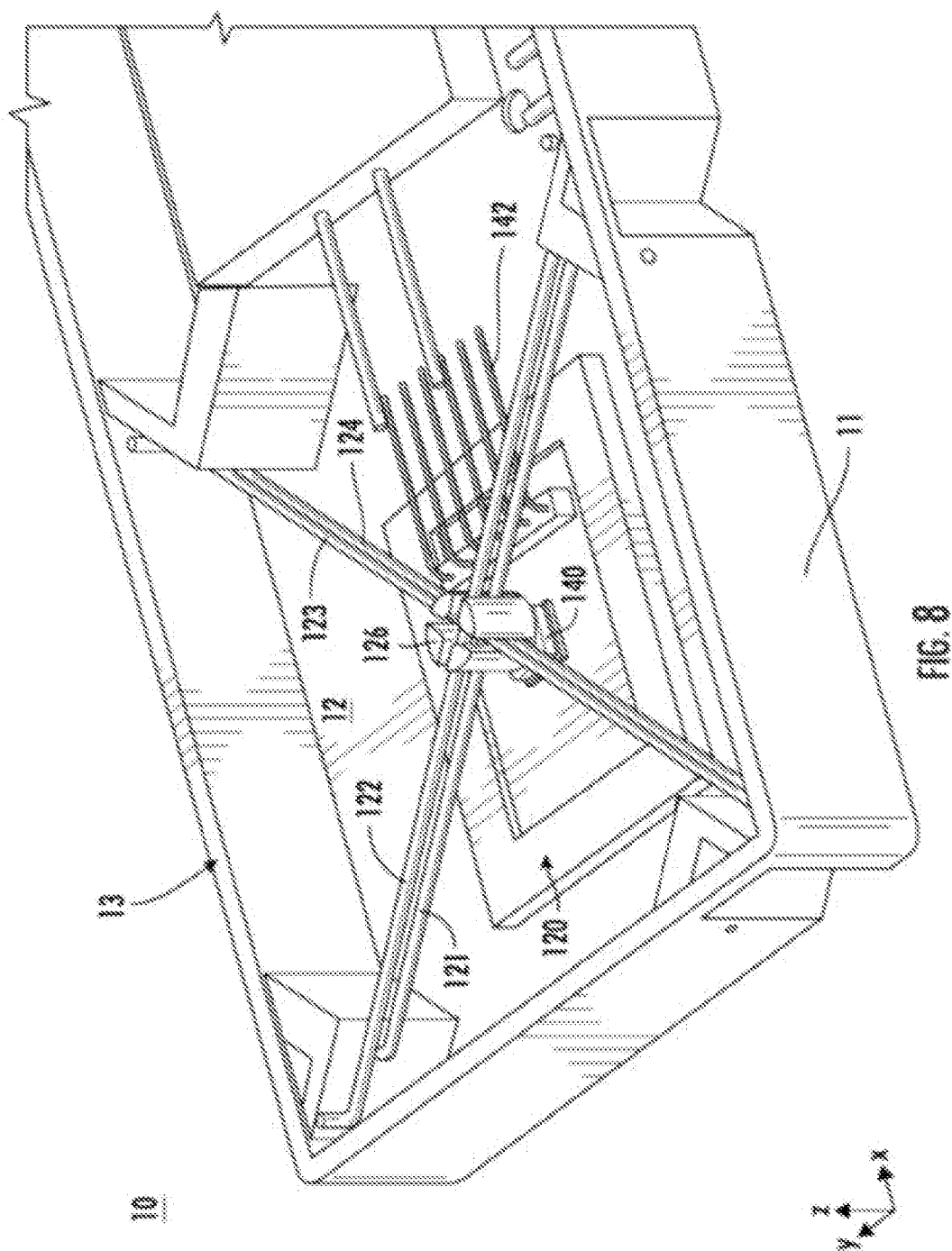
FIG. 8 illustrates a perspective view of an exemplary apparatus in accordance with various embodiments.

As illustrated in FIG. 8, the lever assembly 120 may be at least substantially disposed with the internal housing portion 12 of the weight measurement device 10. Each of the plurality of levers 121, 122, 123, 124 of the lever assembly comprises a lever anchor point dispose about an outer portion of the internal housing portion 12. Similarly, the respective lever tray interfaces of each of the plurality of levers 121, 122, 123, 124 is configured to engage a receiving tray of the scale portion at an outer perimeter thereof. Further, as illustrated, the plurality of levers is configured such that the lever alignment axis 125 extends through a substantially central portion of the scale portion of the weight measurement device 10, with the force sensor 140 being similarly positioned at the ally central portion of the scale portion. As a non-limiting example, in various embodiments, one or more of the plurality of lever face interfaces, the plurality of lever anchor points, the positioning of the force sensor 140 within the internal housing portion 12, and the arrangement of the lever alignment axis 125 within the internal housing portion 12 may be selectively designed so as to configure the common lever ratio, as described herein, such that the mechanical advantage facilitated by the lever assembly 120 enables the operability of the weight measurement device 10 according to one or more design specifications and/or performance specifications. For example, each of the plurality of lever anchor points may be disposed within the internal housing portion 12 at least substantially proximate a central portion of the scale portion. In such a circumstance, the lever ratio (e.g., the ratio of the total lever length to the lever fulcrum length) of each of the plurality of levers would increase, as the lever fulcrum length of each lever would define a lesser percentage of the total lever length compared to those of the exemplary lever assembly 120 illustrated in FIG. 8.

Figure 9:
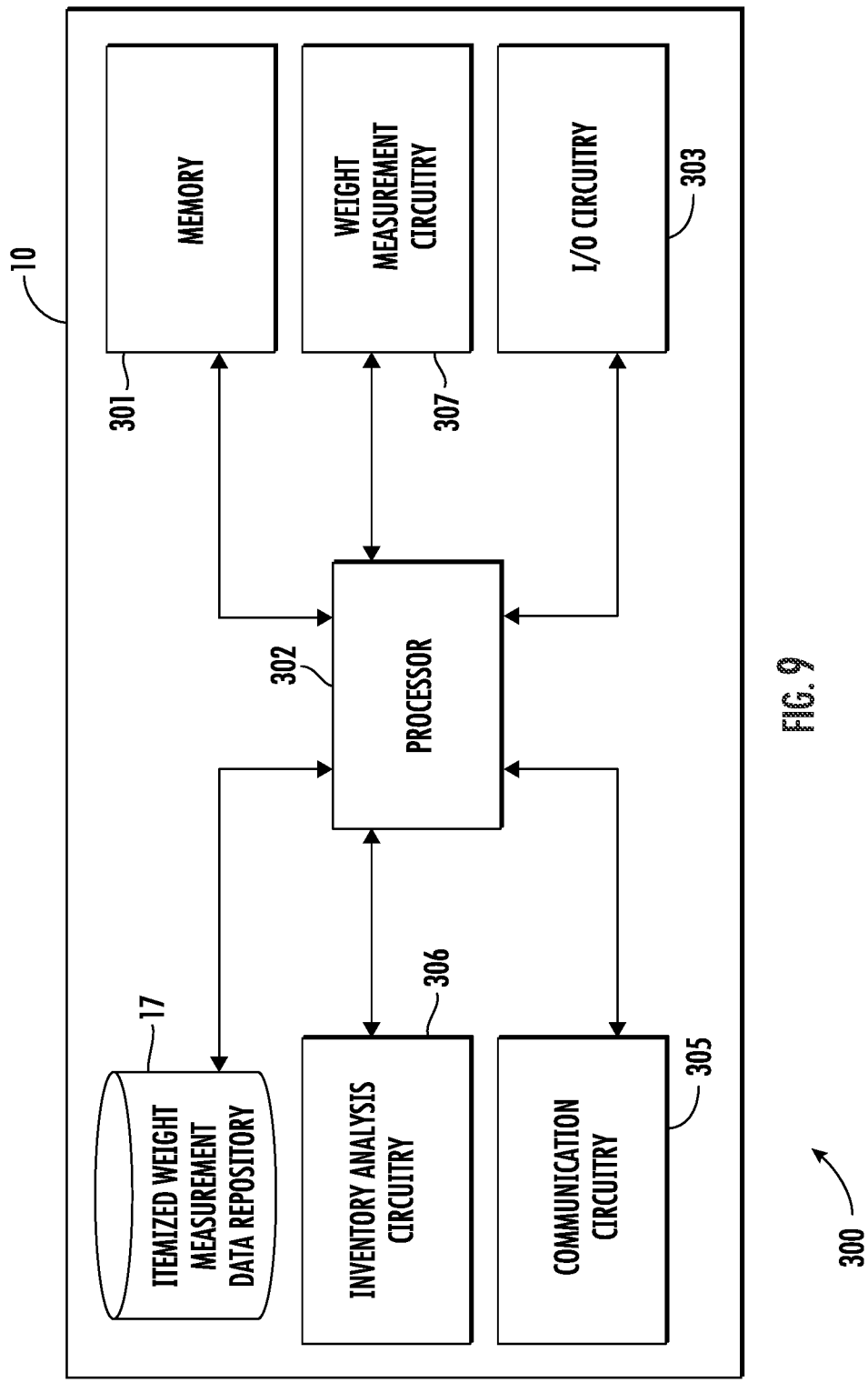
FIG. 9 schematically illustrates an exemplary apparatus for implementing various embodiments of the present disclosure.

As illustrated in FIG. 9, the weight measurement device 10 may comprise a controller 300, which may comprise a memory 301, a processor 302, input/output circuitry 303, communication circuitry 305, an itemized weight measurement data repository 17, weight measurement circuitry 307, and inventory analysis circuitry 306. In various embodiments, the controller 300 may be configured to execute at least a portion of the operations described herein. Although the components are described with respect to functional limitations, it should be understood that the particular implementations include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the controller 300 should therefore be understood broadly to include particular hardware, hardware and, in some embodiments, software for configuring the hardware configured to perform the functions associated with the particular circuitry as described herein. For example, in some embodiments, "circuitry" may include processing circuitry, storage media, network interfaces, input/output devices, and the like. In some embodiments, other elements of the controller 300 may provide or supplement the functionality of particular circuitry. For example, the processor 302 may provide processing functionality, the memory 301 may provide storage functionality, the communications circuitry 305 may provide network interface functionality, and the like.

In some embodiments, the processor 302 (and/or co-processor or any other processing circuitry assisting or otherwise associated with the processor) may be in communication with the memory 301 via a bus for passing information among components of the apparatus. The memory 301 may be non-transitory and may include, for example, one or more volatile and/or non-volatile memories. For example, the memory 301 may be an electronic storage device (e.g., a computer readable storage medium). In various embodiments, the memory 301 may be configured to store information, data, content, applications, instructions, or the like, for enabling the apparatus to carry out various functions in accordance with example embodiments of the present disclosure. It will be understood that the memory 301 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. As a non-limiting example, the memory 301 may be configured to store force sensor data, scale portion configuration data, weight measurement data, object weight data, timestamp data, location data, and inventory measurement data. In various embodiments, the memory 301 may be further configured to store one or more object weight look-up tables.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 301 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the controller 300 may include input-output circuitry 303 that may, in turn, be in communication with the processor 302 to provide output to the user and, in some embodiments, to receive input such as a command provided by the user. In various embodiments, the input-output circuitry 303 may comprise a user interface, as described herein, such as a graphical user interface (GUI), and may include a display that may include a web user interface, a GUI application, a mobile application, a client device, or any other suitable hardware or software. In some embodiments, As described herein, in various embodiments, the input-output circuitry 303 may communicate with a user interface display 201, such as, for example, a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processor 302, input-output circuitry 303 (which may utilize the processing circuitry), or both may be configured to control one or more functions of one or more user interface elements through computer-executable program code instructions (e.g., software, firmware) stored in a non-transitory computer-readable storage medium (e.g., memory 301). Input-output circuitry 303 is optional and, in some embodiments, the controller 300 may not include input-output circuitry. For example, where the controller 300 does not interact directly with the user, the controller 300 may generate user interface data for display by one or more other devices with which one or more users directly interact and transmit the generated user interface data to one or more of those devices. For example, the controller 300, using input-output circuitry 303 may generate user interface data for display by one or more display devices and transmit the generated user interface data to those display devices. In various embodiments, the input-output circuitry 303 may generate a user interface configured to display weight measurement data and/or inventory measurement data corresponding to an at least one object placed on the scale portion of the weight measurement device.

The communications circuitry 305 may be a device or circuitry embodied in either hardware or a combination of hardware and software that is configured to receive and/or transmit data from/to a network and/or any other device, circuitry, or module in communication with the controller 300. In various embodiments, the communications circuitry 305 may comprise the wireless transceiver 14. For example, the communications circuitry 305 may be configured to communicate with one or more computing entities via wired (e.g., USB) or wireless (e.g., Bluetooth, Wi-Fi, cellular, and/or the like) communication protocols.

In various embodiments, the processor 302 may be configured to communicate with the weight measurement circuitry 307. The weight measurement circuitry 307 may be a device or circuitry embodied in either hardware or a combination of hardware and software that is configured to generate weight measurement data related to one or more objects disposed upon a receiving tray of the scale portion of the weight measurement device. In various embodiments, weight measurement data may comprise an output weight value of the one or more objects disposed upon the receiving tray and may be determined based at least in part on force sensor data generated by the force sensor of the weight measurement device. The force sensor data may comprise an output force value corresponding to the collective lever force applied to the force sensor by a lever assembly, as described herein. In various embodiments, the weight measurement circuitry 307 may be configured to convert the force sensor data comprising the output force value to weight measurement data based at least in part on scale portion configuration data, such as, for example, a known common lever ratio and/or a known force multiplication factor based at least in part on the configuration of the scale portion of the weight measurement device. For example, in various embodiments, the weight measurement circuitry 307 may be configured to execute the equation below in order to convert the force sensor data comprising the output force value to weight measurement data:

$$F_{Total\ Weight} = \left(\frac{\text{Lever Fulcrum Length}}{\text{Lever Length}}\right)(F_{Sensor\ Output})$$

Alternatively or additionally, as a further non-limiting example, in various embodiments, the weight measurement circuitry 307 may be configured to execute the equation below in order to convert the force sensor data comprising the output force value to weight measurement data:

$$F_{Sensor\ Output} = \left(\frac{\text{Force Sensor Sensitivity}}{\text{Force Sensor Range}}\right)(F_{Total\ Weight}) - F_{Receiving\ Tray\ Weight}$$

As an example, the weight measurement circuitry 307 may be configured to generate weight measurement data corresponding to an object having a weight of at least about 0.5 grams (e.g., 2.0 grams). In various embodiments, the weight measurement circuitry 307 may be configured to utilize one or more executable instructions and/or machine learning models so as to identify the noise in the force sensor data and isolate the portion of the force sensor data generated by the collective lever force, as described herein. Further, in various embodiments, the weight measurement circuitry 307 may be configured to apply one or more compensation factors to the weight measurement data associated with an object to account for ambient conditions associated with the ambient environment. For example, in various embodiments, the weight measurement circuitry 307 may be configured to apply an appropriate compensation factor based at least in part on the ambient temperature, the ambient humidity, and/or an external force generated by the ambient environment such as a wind gust determined to be acting on the receiving tray of the scale portion. By way of further example, in various embodiments, the weight measurement circuitry 307 may comprise an analog circuit and may include a low-pass, high-pass, band-pass filtering circuit, and/or the like. Alternatively or additionally, the weight measurement circuitry 307 may comprise a digital circuit such as, for example, an Application Specific Integrated Circuit (ASIC). In such an exemplary embodiment, the controller 300 may be configured to facilitate one or more digital filtering techniques utilizing, for example, one or more rounding and/or moving average functions or Finite Impulse Response (FIR) filters. In various embodiments, the weight measurement circuitry 307 may be configured to generate one or more weight measurement data identifiers uniquely corresponding to one or more respective weight measurement data, such that the one or more weight measurement data may be identified and or referenced. For example, in various embodiments, the one or more weight measurement identifiers may correspond to one or both of timestamp data and location data. In various embodiments, the weight measurement circuitry 307 may be configured to render at least a portion of the weight measurement data for display in a weight measurement data interface, for example, at a user interface display of the user interface portion. Further, in various embodiments, the weight measurement circuitry 307 may be configured to transmit weight measurement data to one or more components of the controller 300, such as, for example, the itemized weight measurement data repository 17 and/or the inventory analysis circuitry 306. Further, in various embodiments, the weight measurement circuitry 307 may be configured to receive user input corresponding to a known object type of an object disposed upon the receiving tray and, based at least in part the weight measurement data corresponding to the object, generate object weight data corresponding to the object type of the object. In various embodiments, the weight measurement circuitry 307 may be configured to compare weight measurement data generated at a first time and at a second time to determine a change in the weight of an at least one object between the first time and the second time, so as to, for example, determine an amount of the at least one object (e.g., particulate matter within a volume of fluid, such as air) received by the scale portion of the weight measurement device between the first time and the second time.

In various embodiments, the processor 302 may be configured to communicate with the inventory analysis circuitry 306. The inventory analysis circuitry 306 may be a device or circuitry embodied in either hardware or a combination of hardware and software that is configured to receive weight measurement data from the weight measurement circuitry 307. In various embodiments, the inventory analysis circuitry 306 may be configured to generate one or more inventory measurement data based at least in part on the weight measurement data corresponding to the one or more object, as described herein. For example, in various embodiments wherein one or more objects of a particular object type are disposed upon a receiving tray of the scale portion of the weight measurement device, the inventory analysis circuitry 306 may be configured to generate inventory measurement data related to the one or more objects. For example, the inventory analysis circuitry 306 may be configured to determine the number of objects (e.g., the object count) of the particular object type that are disposed upon the receiving tray of the scale portion. In various embodiments, the inventory analysis circuitry 306 may be configured to determine the number of objects (e.g., the object count) of the particular object type disposed upon the receiving tray of the scale portion based at least in part on user input. For example, in various embodiments, the weight measurement device may be configured to receive user input, as described herein, comprising, for example, a known object count (e.g., a known quantity of items disposed upon the receiving tray) of the one or more objects of the particular object type. The inventory analysis circuitry 306 may be configured to communicate with the weight measurement circuitry 307 to determine the object weight data associated with the one or more objects on the receiving tray. Based at least in part on the weight measurement data corresponding to the collective one or more objects and the object count generated by the aforementioned user input, the inventory analysis circuitry 306 may be configured to learn the object weight associated with a single object of the particular object type. The inventory analysis circuitry 306 may be further configured to communicate with the itemized weight measurement data repository 17 in order to associate the known singular object weight with the particular object type and store the corresponding weight measurement data, for example, in an object weight look-up table. Alternatively or additionally, in various embodiments, the inventory analysis circuitry 306 may be configured to learn the object weight corresponding to an object of a particular object type and/or determine the object count of one or more objects of the particular object type disposed upon the receiving tray based at least in part on one or more machine learning models. Further, in various embodiments, the inventory analysis circuitry 306 may be configured to learn object weight corresponding to an object of a particular object type based on user input providing the object weight of an object and associating the known object weight with a particular object type.

Further, in various embodiments, the inventory analysis circuitry 306 may be configured to receive and/or retrieve object weight data from one or more components of the controller 300, such as, for example, the itemized weight measurement data repository 17 and/or the weight measurement circuitry 307. The inventory analysis circuitry 306 may be configured to determine the number of objects of the particular object type that are disposed upon the receiving tray of the scale portion based at least in part on object weight data corresponding to the particular object type. For example, inventory analysis circuitry 306 may be configured to determine the object count of the one or more objects disposed upon the receiving tray of the scale portion based at least in part on user input providing the object type of each of the one or more objects disposed upon the receiving tray. For example, in various embodiments, the weight measurement device may be configured to receive user input, as described herein, comprising, for example, a user selection of a listed object type displayed at a user interface display, the selected object type corresponding to a particular object type of the one or more objects disposed upon the receiving tray of the weight measurement device. The inventory analysis circuitry 306 may be configured to communicate with the itemized weight measurement data repository 17 (e.g., parse an object weight look-up table stored therein) in order to identify the known object weight for a single object of the selected object type. As described herein, the inventory analysis circuitry 306 may be further configured to communicate with the weight measurement circuitry 307 to determine the object weight data associated with the one or more objects disposed upon the receiving tray. Based at least in part on the weight measurement data generated by the weight measurement circuitry 307, the inventory analysis circuitry 306 may be configured to generate inventory analysis data comprising an object count of the one or more objects disposed upon the receiving tray. In various embodiments, the inventory analysis circuitry 306 may be configured to correlate changes in weight measurement data (e.g., real-time object weight data of one or more objects disposed on the receiving tray) to a change in object count.

As a non-limiting example, a user may place a container housing a plurality of prescription pills of the same type (e.g., object type) on the receiving tray of the scale portion of an exemplary weight measurement device, as described herein. In various embodiments, the weight measurement circuitry 307 may be configured to calibrate (e.g., tare) the force sensor output to account for the portion of the total object weight represented by the object weight of the container, thereby isolating the output weight measurement data to the object weight corresponding to the plurality of pills contained within the container. In various embodiments, wherein the object weight associated with a single pill of the type housed within the container is stored within the itemized weight measurement data repository 17, the inventory analysis circuitry 306 may be configured to receive user input comprising a user selection of a listed object type displayed at a user interface display corresponding to the pill type of the plurality of pills housed within the container. In such an exemplary circumstance, the inventory analysis circuitry 306 may be configured to generate inventory analysis data comprising a pill count (e.g., object count) of the plurality of pills based at least in part on a comparison of the stored object weight corresponding to a single pill of the type housed within the container and the weight measurement data received from the weight measurement circuitry 307. Alternatively, or additionally, in various embodiments wherein the object weight associated with a single pill of the type housed within the container is known by the user, the inventory analysis circuitry 306 may be configured to receive user input comprising a known object weight of a single pill of the type housed within the container. In such an exemplary circumstance, the inventory analysis circuitry 306 may be configured to generate inventory analysis data comprising a pill count (e.g., object count) of the plurality of pills based at least in part on a comparison of the user-provided object weight corresponding to a single pill of the type housed within the container and the weight measurement data received from the weight measurement circuitry 307. Alternatively, or additionally, in various embodiments wherein the object weight associated with a single pill of the type housed within the container is neither known by the user nor stored in the itemized weight measurement data repository 17, the inventory analysis circuitry 306 may be configured to first learn the object weight associated with the prescription pill based at least in part upon user input comprising both the pill type (e.g., object type) and a known pill count (e.g., object count) of the number of pills housed within the container. The inventory analysis circuitry 306 may be configured to learn the object weight corresponding to a single pill of the type housed within the container based at least in part on a comparison between the known pill count (e.g., object count) of the number of pills housed within and the weight measurement data received from the weight measurement circuitry 307. The inventory analysis circuitry 306 may further associate the determined object weight with the pill type provided via the user input, and may be configured to transmit said object weight associated with the pill type to the itemized weight measurement data repository 17. For example, based at least in part on weigh measurement data received from the weight measurement circuitry 306 and the stored and/or input, as described above, object weight corresponding to a single pill of the type disposed within the container disposed upon the receiving stray, the inventory analysis circuitry 306 may be able to determine the pill count of the plurality of pills within the container, and further, over time, whether one or more pill has been either added or removed from the container.

Further, in various embodiments, the inventory analysis circuitry 306 may be configured to render at least a portion of the inventory measurement data for display in an inventory measurement data interface, for example, at a user interface display of the user interface portion. In various embodiments, the inventory analysis circuitry 306 may be further configured to associate one or both of timestamp data and location data with the inventory measurement data. In various embodiments, the inventory analysis circuitry 306 may be configured to compare inventory measurement data comprising a determined number of objects of a particular object type that are disposed upon the receiving tray of the scale portion to a predetermined threshold number of objects of the particular object type that should be disposed upon the receiving tray of the scale portion. The inventory analysis circuitry 306 may be further configured to identify when the determined number of objects of the particular object type disposed upon the receiving tray either increases or decreases beyond the allowable threshold number and, in response, transmit one or more electronic and/or communication signals to one or more components of the controller 300. Further, in various embodiments, the inventory analysis circuitry 306 may be configured to transmit inventory measurement data to one or more components of the controller 300, such as, for example, the itemized weight measurement data repository 17 and/or the weight measurement circuitry 307.

In various embodiments, the weight measurement device 10 may be configured with, or in communication with, an itemized weight measurement data repository 17. The itemized weight measurement data repository 17 may be stored, at least partially on the memory 301 of the weight measurement device 10. In some embodiments, itemized weight measurement data repository 17 may be remote from, but in connection with, the weight measurement device 10. The itemized weight measurement data repository 17 may contain information, such as, for example, various force sensor data, scale portion configuration data, weight measurement data, object weight data, timestamp data, location data, and inventory measurement data. In various embodiments, the itemized weight measurement data repository 17 may be further configured to store information, such as, for example, one or more object weight look-up tables. In various embodiments, an object weight look-up table may comprise a list comprising the object weight data (e.g., weight) associated with a plurality of different objects having different object types.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A weight measurement device comprising:
a housing defining an interior housing portion;
a receiving tray configured to receive a weight force generated by an object weight of one or more objects disposed on the receiving tray;
a lever assembly comprising a plurality of levers, wherein each lever of the plurality of levers comprises a lever arm extending from a first end to a second end of the receiving tray via a lever alignment component, underneath a portion of the receiving tray, defining a length of the lever, the first end of the lever is configured to interface with at least a portion of the receiving tray and the second end of the lever is anchored to a portion of the housing;
wherein a portion of the weight force from the receiving tray is transmitted to the respective first end of each lever of the plurality of levers of the lever assembly in a downward vertical direction; and a force sensor configured to receive a collective lever force from the lever assembly via a lever coupling component in a vertical direction and generate force sensor data.

2. The weight measurement device of claim 1, wherein the lever alignment component is configured to secure an angular position of each of the plurality of levers relative to one another.

3. The weight measurement device of claim 1, wherein a portion of each of the plurality of levers extends through the lever alignment component such that the plurality of levers is arranged in a vertical stack configuration.

4. The weight measurement device of claim 1, wherein the receiving tray comprises a plurality of lever attachment points corresponding to the plurality of levers of the lever assembly, each of the lever attachments points configured to receive first end of the corresponding lever of the lever assembly.

5. The weight measurement device of claim 4, wherein at least one of the lever attachment points comprises a socket and the corresponding lever comprises an extension at the first end of the lever arm configured to be inserted into the socket.

6. The weight measurement device of claim 1, wherein the force sensor comprises a single piezoresistive sensor.

7. The weight measurement device of claim 1, wherein at least one of the housing and the receiving tray is made of at least in part of rigid material and/or resilient material.

8. The weight measurement device of claim 1, further comprising a dock element configured to secure the force sensor underneath both the receiving tray and the lever assembly such that the force sensor receives the collective lever force transmitted from the lever assembly.

9. The weight measurement device of claim 1, further comprising a controller configured to generate weight measurement data based at least in part on the force sensor data, wherein the weight measurement data corresponds at least in part to the object weight of the at least one object.

10. The weight measurement device of claim 9, wherein the controller is further configured to generate inventory measurement data based at least in part on the weight measurement data, wherein the inventory measurement data comprises an object count.

11. The weight measurement device of claim 1, further comprising at least one receiving tray stop configured to at least partially restrict a range of motion of the receiving tray.

12. The weight measurement device of claim 1, further comprising a user interface portion, the user interface portion comprising a user interface display configured to display one or more of force sensor data, weight measurement data, and inventory measurement data.

13. A method of generating weight measurement data corresponding to one or more objects, the method comprising:

receiving a weight force corresponding to an object weight generated by one or more objects at a receiving tray;

transmitting the weight force to a lever assembly operatively connected to the receiving tray, the lever assembly comprising a plurality of levers, wherein each lever of the plurality of levers comprises a lever arm extending from a first end to a second end of the receiving tray via a lever alignment component, underneath a portion of the receiving tray, defining a length of the lever, the first end of the lever is configured to interface with at least a portion of the receiving tray and the second end of the lever is anchored to a portion of the housing;

generating a collective lever force based at least in part on a configuration of the plurality of levers of the lever assembly, the collective lever force corresponding at least in part to the weight force;

transmitting the collective lever force to a force sensor operatively connected to the lever assembly via a lever coupling component;

generating force sensor data based at least in part on the collective lever force received by the force sensor; and generating weight measurement data based at least in part on the force sensor data, wherein the weight measurement data comprises the object weight of the at least one object.

14. The method of claim 13, wherein generating weight measurement data based at least in part on the force sensor data comprises identifying a noise in the force sensor data and isolating the portion of the force sensor data generated by the collective lever force.

15. The method of claim 13, wherein generating weight measurement data based at least in part on the force sensor data comprises applying one or more compensation factors to the generated weight measurement data to account for one or more of ambient conditions associated with the ambient environment and a multiplication factor realized by the force sensor data based at least in part on the configuration of the lever assembly.

16. The method of claim 13, wherein generating weight measurement data based at least in part of object weight data corresponding to the object type of the object, wherein the object type of the one or more objects at the receiving tray is obtained from a user input.

17. The method of claim 13, further comprising generating weight measurement data identifier corresponding to the weight measurement data, wherein the weight measurement identifier comprises at least one of geolocation data and timestamp data.

18. The method of claim 13, further comprising comparing weight measurement data generated at a first time and weight measurement data generated at a second time to determine a change in the weight of an at least one object between the first time and the second time.

19. The method of claim 18, further comprising determining a change in an object count based on the change in the weight of at least one object and the object type of the one or more objects at the receiving tray, wherein the object type of the one or more objects is obtained from a user input.

20. The method of claim 13, further comprising determining object count of one or more objects based on the weight measurement data and the object type of the one or more objects at the receiving tray, wherein the object type of the one or more objects is obtained from a user input.

\* \* \* \* \*